(12) United States Patent
Gates et al.

(10) Patent No.: US 12,451,260 B2
(45) Date of Patent: Oct. 21, 2025

(54) PLANAR COIL STELLARATOR INCLUDING REMOVABLE FIELD SHAPING UNITS

(71) Applicant: THEA ENERGY, INC., Branchburg, NJ (US)

(72) Inventors: David Allen Gates, Princeton, NJ (US); Charles Pendleton Stuntz Swanson, Lawrence Township, NJ (US); Andrew Thomas Cote, San Francisco, CA (US)

(73) Assignee: THEA ENERGY, INC., Branchburg, NJ (US)

( * ) Notice: Subject to any disclaimer, the term of this patent is extended or adjusted under 35 U.S.C. 154(b) by 0 days.

(21) Appl. No.: 19/003,376

(22) Filed: Dec. 27, 2024

(65) Prior Publication Data

US 2025/0157677 A1    May 15, 2025

Related U.S. Application Data

(63) Continuation of application No. PCT/US2024/025937, filed on Apr. 24, 2024.

(60) Provisional application No. 63/462,041, filed on Apr. 26, 2023.

(51) Int. Cl.
*G21B 1/05* (2006.01)
*G21B 1/25* (2006.01)

(52) U.S. Cl.
CPC ............. *G21B 1/055* (2013.01); *G21B 1/25* (2013.01)

(58) Field of Classification Search
None
See application file for complete search history.

(56) References Cited

U.S. PATENT DOCUMENTS

| | | | |
|---|---|---|---|
| 3,015,618 A | 1/1962 | Stix | |
| 3,052,617 A * | 9/1962 | Post | H05H 1/22 376/127 |
| 3,088,894 A * | 5/1963 | Koenig | G21B 1/055 376/150 |
| 3,219,534 A | 11/1965 | Furth | |
| 3,278,384 A | 10/1966 | Lenard et al. | |
| 3,607,627 A * | 9/1971 | Furth | G21B 1/055 376/134 |

(Continued)

FOREIGN PATENT DOCUMENTS

| | | |
|---|---|---|
| CN | 112786273 B | 9/2022 |
| WO | 2014039579 A2 | 3/2014 |

(Continued)

OTHER PUBLICATIONS

Murakami, S., A. Wakasa, H. Maaßberg, C. D. Beidler, H. Yamada, K. Y. Watanabe, and LHD Experimental Group. "Neoclassical Transport Optimization of LHD." Nuclear Fusion 42, No. 11 (Sep. 2002): L19. https://doi.org/10.1088/0029-5515/42/11/101.

(Continued)

*Primary Examiner* — Srinivas Sathiraju
(74) *Attorney, Agent, or Firm* — Charney IP Law LLC; Thomas M. Finetti

(57) ABSTRACT

The present disclosure is directed to stellarators or assemblies including a stellarator including removable and/or replaceable components, such as removable field shaping units and/or removable shaping coils. In some embodiments, the stellarators of the present disclosure include a toroidal sector, which includes one or more removable field shaping units.

20 Claims, 29 Drawing Sheets

(56) References Cited

U.S. PATENT DOCUMENTS

| | | | | |
|---|---|---|---|---|
| 3,779,864 | A | | 12/1973 | Kaw et al. |
| 3,801,438 | A | * | 4/1974 | Ohkawa .................. H05H 1/12 |
| | | | | 376/133 |
| 4,007,392 | A | * | 2/1977 | Valfells .................. H05H 1/10 |
| | | | | 313/154 |
| 4,663,109 | A | * | 5/1987 | Reiman ................. G21B 1/055 |
| | | | | 376/142 |
| 4,735,765 | A | | 4/1988 | Harris et al. |
| H554 | H | | 12/1988 | Dawson et al. |
| 4,826,646 | A | | 5/1989 | Bussard |
| 7,994,724 | B2 | * | 8/2011 | Dine ................ H01J 37/32091 |
| | | | | 315/111.41 |
| 8,124,906 | B2 | * | 2/2012 | Holber ..................... H05H 1/46 |
| | | | | 219/121.48 |
| 8,134,440 | B2 | * | 3/2012 | Beckenbach .......... H05H 13/04 |
| | | | | 315/501 |
| 8,324,814 | B2 | * | 12/2012 | Pelletier ............ H01J 37/32623 |
| | | | | 118/723 MR |
| 8,383,525 | B2 | * | 2/2013 | Raisanen .............. C23C 16/405 |
| | | | | 438/778 |
| 8,496,872 | B1 | * | 7/2013 | Weires ................... C21D 1/667 |
| | | | | 266/252 |
| 8,590,485 | B2 | * | 11/2013 | Biloiu ..................... H01J 27/16 |
| | | | | 118/723 MR |
| 8,648,534 | B2 | * | 2/2014 | You ...................... H01J 37/3222 |
| | | | | 315/111.41 |
| 9,036,765 | B2 | * | 5/2015 | Birnbach ................. G21B 1/00 |
| | | | | 376/105 |
| 9,947,511 | B2 | * | 4/2018 | Ando ............... H01J 37/32522 |
| 9,967,963 | B2 | * | 5/2018 | Zindler .................... H05H 1/04 |
| 10,639,492 | B2 | * | 5/2020 | Cook ...................... A61N 2/006 |
| 10,744,338 | B2 | * | 8/2020 | Cook ....................... H01F 7/064 |
| 10,811,144 | B2 | * | 10/2020 | Laberge ................. G21B 1/057 |
| 11,646,139 | B2 | | 5/2023 | Xu et al. |
| 12,009,111 | B2 | * | 6/2024 | Gates ......................... G21B 1/13 |
| 12,100,520 | B2 | * | 9/2024 | Gates ......................... H01F 6/06 |
| 2008/0285700 | A1 | * | 11/2008 | Davis ........................ G21B 1/23 |
| | | | | 376/137 |
| 2009/0231583 | A1 | * | 9/2009 | Smith ........................ G01J 4/04 |
| | | | | 356/367 |
| 2012/0247679 | A1 | | 10/2012 | Yamazawa |
| 2015/0245461 | A1 | * | 8/2015 | Belchenko ............... H05H 3/02 |
| | | | | 250/251 |
| 2015/0279621 | A1 | | 10/2015 | Brown et al. |
| 2015/0380114 | A1 | * | 12/2015 | Park .......................... H05H 1/11 |
| | | | | 376/144 |
| 2018/0207438 | A1 | * | 7/2018 | Cook ....................... H01F 7/064 |
| 2018/0226805 | A1 | * | 8/2018 | Cao ............................ H02J 3/32 |
| 2019/0009902 | A1 | * | 1/2019 | Chan ...................... H10N 60/80 |
| 2019/0009903 | A1 | * | 1/2019 | Chan ...................... B64D 27/34 |
| 2022/0208397 | A1 | * | 6/2022 | Xu ............................. H05H 1/12 |
| 2023/0290525 | A1 | * | 9/2023 | Gates ........................ H01F 6/06 |
| 2023/0317304 | A1 | * | 10/2023 | Gates ........................ G21G 4/02 |
| | | | | 376/191 |
| 2024/0153651 | A1 | * | 5/2024 | Gates ........................ H01F 6/06 |
| 2024/0177874 | A1 | * | 5/2024 | Gates ........................ G21B 1/13 |

FOREIGN PATENT DOCUMENTS

| | | | | |
|---|---|---|---|---|
| WO | 2020185544 | A1 | | 9/2020 |
| WO | WO-2023055022 | A1 | * | 4/2023 ............ H01J 37/321 |
| WO | 2023178004 | A1 | | 9/2023 |

OTHER PUBLICATIONS

Bellan, Paul M. Fundamentals of Plasma Physics. Cambridge: Cambridge University Press, 2006. https://doi.org/10.1017/CBO9780511807183.

Wesson, John. Tokamaks. Third Edition. Oxford: Clarendon Press, 2004.

Chen, Francis F. Introduction to Plasma Physics and Controlled Fusion. Cham: Springer International Publishing, 2016. https://doi.org/10.1007/978-3-319-22309-4.

Richardson, A. S. "NRL Plasma Formulary." Washington, DC 20375, USA: Naval Research Laboratory, 2019. https://www.nrl.navy.mil/ppd/content/nrl-plasma-formulary.

Freidberg, Jeffrey P. Ideal Magnetohydrodynamics. Plenum Publishing Company Limited, 1987.

Imbert-Gerard, Lise-Marie, Elizabeth J. Paul, and Adelle M. Wright. An Introduction to Stellarators: From Magnetic Fields to Symmetries and Optimization, 2019. https://arxiv.org/abs/1908.05360v2.

Helander, Per. "Theory of Plasma Confinement in Non-Axisymmetric Magnetic Fields." Reports on Progress in Physics 77, No. 8 (Jul. 2014): 087001. https://doi.org/10.1088/0034-4885/77/8/087001. lander.

Hudson, S. R., D. A. Monticello, A. H. Reiman, A. H. Boozer, D. J. Strickler, S. P. Hirshman, and M. C. Zarnstorff. "Eliminating Islands in High-Pressure Free-Boundary Stellarator Magnetohydrodynamic Equilibrium Solutions." Physical Review Letters 89, No. 27 (Dec. 20, 2002): 275003. https://doi.org/10.1103/PhysRevLett.89.275003.

Hastie, R. J., G. D. Hobbs, and J. B. Taylor. "Non-Adiabatic Behaviour of Particles in Inhomogeneous Magnetic Fields." Plasma Physics and Controlled Nuclear Fusion Research. Proceedings of the Third International Conference on Plasma Physics and Controlled Nuclear Fusion Research. vol. I, 1969. http://inis.iaea.org/Search/search.aspx?orig_q=RN:44064054.

Vaclavik, J., and K. Appert. "Theory of Plasma Heating by Low Frequency Waves: Magnetic Pumping and Alfvén Resonance Heating." Nuclear Fusion 31, No. 10 (Oct. 1991): 1945. https://doi.org/10.1088/0029-5515/31/10/013.

Nemov, V. V., S. V. Kasilov, W. Kernbichler, and M. F. Heyn. "Evaluation of 1/v Neoclassical Transport in Stellarators." Physics of Plasmas 6, No. 12 (Dec. 1, 1999): 4622-32. https://doi.org/10.1063/1.873749.

Grad, H. Containment in Cusped Plasma Systems. United States: N. p. 1961. Web.

Helander, P., et al. "Stellarators with permanent magnets." Physical review letters 124.9 (2020): 095001. (Year: 2020).

Menard, Jonathan. "Progress and plans for NSTX Upgrade and prospects for next-step spherical tori." University of California Berkeley (2016). (Year: 2016).

Gerhardt, S. P., R. Andre, and J. E. Menard. "Exploration of the equilibrium operating space for NSTX-Upgrade." Nuclear Fusion 52.8 (2012): 083020. (Year: 2012).

Menard, J. E., et al. "Overview of the physics and engineering design of NSTX upgrade." Nuclear Fusion 52.8 (2012): 083015. (Year: 2012).

Gates, David A, et al. "Stellarator research opportunities: a report of the national stellarator coordinating committee." Journal of Fusion Energy 37 (2018): 51-94. (Year: 2018).

Brown, T., et al. "Engineering optimization of stellarator coils lead to improvements in device maintenance." 2015 IEEE 26th Symposium on Fusion Engineering (SOFE). IEEE, 2015. (Year: 2015).

Brown, T. G. "Three confinement systems-spherical tokamak, standard tokamak, and stellarator: a comparison of key component cost elements." IEEE Transactions on Plasma Science 46.6 (2018): 2216-2230. (Year: 2018).

Li, Jessica L., et al. "Large vacuum flux surfaces generated by tilted planar coils." Plasma physics and controlled fusion 61. 7 (2019): 075005. (Year: 2019).

Gates, D. A, et al. "Recent advances in stellarator optimization." Nuclear Fusion 57.12 (2017): 126064. (Year: 2017).

International Search Report and Written Opinion for PCT/US2024/025937, dated Sep. 12, 2024.

Isobe M et al: "Fusion neutron production with deuterium neutral beam injection and enhancement of energetic-particle physics study in the large helical device", Nuclear Fusion, Publishing Section. Vienna, AT, vol. 58, No. 8, Jun. 29, 2018 (Jun. 29, 2018).

Zarnstorff M C et al: "Simpler optimized stellarators using permanent magnets", Nuclear Fusion., Jun. 25, 2021 (Jun. 25, 2021) , pp. 1-4.

(56) References Cited

OTHER PUBLICATIONS

Zarnstorff M C: "Progress on the Stellarator Path to Fusion Power", Fusion Power Associates Meeting, Dec. 16, 2021 (Dec. 16, 2021), pp. 1-15.

Caoxiang Zhu et al: "Topology 18-54 optimization of permanent magnet s for stellarators", Nuclear Fusion, Publishing Section. Vienna, AT, vol. 60, No. 10, Aug. 21, 2020 (Aug. 21, 2020), p. 106002.

Paul Moroz, Vacuum flux surfaces produced by inclined coils, Physics of Plasmas 2, 4269 (1995); https://doi.org/10.1063/1.871052.

Guodong Yu, A neoclassically optimized compact stellarator with four planar coils, Phys. Plasmas 28, 092501 (2021); https://doi.org/10.1063/5.0057834.

Nagaoka, et al., "Neutral Beam Injectors," https://www-lhd.nifs.ac.jp/pub/pdf/LHD_Guide/heating_devices/NBI.pdf (undated).

Neilson, G. H., et al. Progress toward attractive stellarators. No. PPPL-4589. Princeton Plasma Physics Lab.(PPPL), Princeton, NJ (United States), 2011. (Year: 2011).

Zhu, Caoxiang, et al. "Designing stellarators using perpendicular permanent magnets." Nuclear Fusion 60.7 (2020): 076016. (Year: 2020).

Lehnert, B. 1975. "On Magnetically Confined Plasmas Used as Neutron Sources." Nuclear Instruments and Methods 129 (1): 27-30. https://doi.org/10.1016/0029-554X(75)90106-8.

Kolesnichenko, Ya I., and S. N. Reznik. 1976. "The D—D Nuclear Fusion Reaction in a Hybrid Reactor." Nuclear Fusion 16 (1): 97. https://doi.org/10.1088/0029-5515/16/1/010.

Hendel, H. W., and D. L. Jassby. 1990. "The Tokamak as a Neutron Source." Nuclear Science and Engineering 106 (2): 114-37. https://doi.org/10.13182/NSE90-A27465.

Dawson, J. M., H. P. Furth, and F. H. Tenney. 1971. "Production of Thermonuclear Power by Non-Maxwellian Ions in a Closed Magnetic Field Configuration." Physical Review Letters 26 (19): 1156-60. https://doi.org/10.1103/PhysRevLett.26.1156.

Jassby, D. L. 1977. "Neutral-Beam-Driven Tokamak Fusion Reactors." Nuclear Fusion 17 (2): 309. https://doi.org/10.1088/0029-5515/17/2/015.

Price, Robert E., Geoffrey W. Shuy, and James T. Woo. 1986. "Deuterium Driven D—T Fusion Reactor Test Facility." Fusion Technology 10 (3P2B): 1412-17. https://doi.org/10.13182/FST86-A24926.

Forest, Cary, Jay Anderson, Dan Brunner, Jan Egedal, Ken Fowler, Alexander Ivanov, Bob Harvey, et al. 2020. "The WHAM (Wisconsin HTS Axisymmetric Mirror) Neutron Source and End Plug On a Low Cost Path to BEAT: Break Even Axisymmetric Tandem." PPPL Colloquium, Princeton Plasma Physics Laboratory, Princeton, NJ, USA, Oct. 14. https://pppl-intranet.princeton.edu/event/pppl-colloquium-cary-forest-university-of-wisconsin-madison-the-wisconsin-axisymmetric-mirror.

International Search Report for PCT/US2023/064025, filed on Mar. 9, 2023.

Heikkinen, D. W. 1988. "RTNS-II (Rotating Target Neutron Source II) Operational Summary." UCRL-98946; CONF-881151-13. Lawrence Livermore National Lab., CA (USA). https://www.osti.gov/biblio/6816875.

Hendel, H. W., A. C. England, D. L. Jassby, A. A. Mirin, and E. B. Nieschmidt. 1986. "Fusion-Neutron Production in the TFTR with Deuterium Neutral-Beam Injection." Journal of Fusion Energy 5 (3): 231-44. https://doi.org/10.1007/BF01050616.

Seki, Ryosuke, Kunihiro Ogawa, Mitsutaka Isobe, Masayuki Yokoyama, Sadayoshi Murakami, Hideo Nuga, Shuji Kamio, Yutaka Fujiwara, Masaki Osakabe, and LHD Experiment Group. 2019. "Evaluation of Neutron Emission Rate with FIT3D-DD Code in Large Helical Device." Plasma and Fusion Research 14: 3402126-3402126. https://doi.org/10.1585/pfr.14.3402126.

Hemsworth, R. S., D. Boilson, P. Blatchford, M. Dalla Palma, G. Chitarin, H. P. L. de Esch, F. Geli, et al. 2017. "Overview of the Design of the ITER Heating Neutral Beam Injectors." New Journal of Physics 19 (2): 025005. https://doi.org/10.1088/1367-2630/19/2/025005.

Helander, Per. 2014. "Theory of Plasma Confinement in Non-Axisymmetric Magnetic Fields." Reports on Progress in Physics 77 (8): 087001. https://doi.org/10.1088/0034-4885/77/8/087001.

Dinklage, A., C. D. Beidler, P. Helander, G. Fuchert, H. Maaßberg, K. Rahbarnia, T. Sunn Pedersen, et al. 2018. "Magnetic Configuration Effects on the Wendelstein 7-X Stellarator." Nature Physics 14 (8): 855-60. https://doi.org/10.1038/s41567-018-0141-9.

Canik, J. M., D. T. Anderson, F. S. B. Anderson, K. M. Likin, J. N. Talmadge, and K. Zhai. 2007. "Experimental Demonstration of Improved Neoclassical Transport with Quasihelical Symmetry." Physical Review Letters 98 (8): 085002. https://doi.org/10.1103/PhysRevLett.98.085002.

Landreman, Matt, and Elizabeth Paul. 2022. "Magnetic Fields with Precise Quasisymmetry for Plasma Confinement." Physical Review Letters 128 (3): 035001. https://doi.org/10.1103/PhysRevLett.128.035001.

Williamson, D., A. Brooks, T. Brown, M. Cole, H.-M. Fan, P. Goranson, M. Hechler, P. Heitzenroeder, B. Nelson, and W.T. Reiersen. 1999. "Design Description of the Saddle Coils for the National Compact Stellarator Experiment (NCSX)." In 18th IEEE/NPSS Symposium on Fusion Engineering. Symposium Proceedings (Cat. No. 99CH37050), 441-44. https://doi.org/10.1109/FUSION.1999.849874.

Yoshimura, Y., S. Kubo, T. Shimozuma, H. Igami, T. Mutoh, Y. Nakamura, K. Ohkubo, et al. 2005. "Achievement of One Hour Discharge with ECH on LHD." Journal of Physics: Conference Series 25 (1): 189. https://doi.org/10.1088/1742-6596/25/1/024.

Beidler, Craig, Günter Grieger, Franz Herrnegger, Ewald Harmeyer, Johann Kisslinger, Wolf Lotz, Henning Maassberg, et al. 1990. "Physics and Engineering Design for Wendelstein VII-X." Fusion Technology 17 (1): 148-68. https://doi.org/10.13182/FST90-A29178.

Neilson, GH, A Brooks, D Johnson, H Kugel, R Majeski, W Reierson, M Zarnstorff, et al. 2000. "NCSX Machine Configuration Design Progress." In Proceedings of the 42nd Annual Meeting of the APS Division of Plasma Physics Combined with the 10th International Congress on Plasma Physics October. Québec City, Canada: American Physical Society. https://pdfs.semanticscholar.org/ae61/55495dc12fc564d69b0ae9f3e2c444edc5e5.pdf.

Rummel, Thomas, Konrad Risze, Johann Kiszlinger, Matthias Koppen, Frank Fullenbach, Hutch Neilson, Tom Brown, and Subrahmanya Ramakrishnan. 2012. "The Trim Coils for the Wendelstein 7-X Magnet System." IEEE Transactions on Applied Superconductivity 22 (3): 4201704-4201704. https://doi.org/10.1109/TASC.2011.2182027.

Todd, T. N. 1990. "Ultra-Simple Stellarators." Plasma Physics and Controlled Fusion 32 (6): 459. https://doi.org/10.1088/0741-3335/32/6/004.

Pedersen, Thomas Sunn, Allen H. Boozer, Jason Paul Kremer, Remi G. Lefrancois, Wayne T. Reiersen, Fred Dahlgren, and Neil Pomphrey. 2004. "The Columbia Nonneutral Torus: A New Experiment to Confine Nonneutral and Positron-Electron Plasmas in a Stellarator." Fusion Science and Technology 46 (1): 200-208. https://doi.org/10.13182/FST04-A556.

Ku, Long-Poe, and Allen H. Boozer. 2009. "Nonaxisymmetric Shaping of Tokamaks Preserving Quasiaxisymmetry." Physics of Plasmas 16 (8): 082506. https://doi.org/10.1063/1.3207010.

Merkel, P. 1987. "Solution of Stellarator Boundary Value Problems with External Currents." Nuclear Fusion 27 (5): 867. https://doi.org/10.1088/0029-5515/27/5/018.

Landreman, Matt. 2017. "An Improved Current Potential Method for Fast Computation of Stellarator Coil Shapes." Nuclear Fusion 57 (4): 046003. https://doi.org/10.1088/1741-4326/aa57d4.

Hammond, K. C., C. Zhu, T. Brown, K. Corrigan, D. A. Gates, and M. Sibilia. 2020. "Geometric Concepts for Stellarator Permanent Magnet Arrays." Nuclear Fusion 60 (10): 106010. https://doi.org/10.1088/1741-4326/aba8dc.

(56) References Cited

OTHER PUBLICATIONS

Zhu, Caoxiang, Michael Zarnstorff, David Gates, and Arthur Brooks. 2020. "Designing Stellarators Using Perpendicular Permanent Magnets." Nuclear Fusion 60 (7): 076016. https://doi.org/10.1088/1741-4326/ab9006.

Sahinidis, Nikolaos V. 2019. "Mixed-Integer Nonlinear Programming 2018." Optimization and Engineering 20 (2): 301-6. https://doi.org/10.1007/s11081-019-09438-1.

Guodong Yu Zhichen Feng Peiyou Jiang Neil Pomphrey Matt Landreman Guoyong Fu: "A neoclassically optimized compact stellarator with four planar coils", arxiv.org, Cornell University Library, 201 Olin Library Cornell University Ithaca, NY 14853, Jun. 10, 2021 (Jun. 10, 2021).

Takeiri Y.: "Prospect Toward Steady-State 1-64 Helical Fusion Reactor Based on Progress of LHD Project Entering the Deuterium Experiment Phase", IEEE Transactions On Plasma Science., vol. 46, No. 5, Oct. 12, 2017 (Oct. 12, 2017), pp. 1141-1148.

Partial Search Report for PCT Application No. PCT/US2023/063949, filed on Mar. 8, 2023.

\* cited by examiner

PLANAR COIL STELLARATOR INCLUDING REMOVABLE FIELD SHAPING UNITS

CROSS REFERENCE TO RELATED APPLICATIONS

The present application is a continuation of International Application No. PCT/US24/25937 filed on Apr. 24, 2024, which application claims the benefit of the filing date of U.S. Provisional Patent Application No. 63/462,041 filed on Apr. 26, 2023, the disclosure of which is hereby incorporated by reference herein in its entirety.

FIELD OF THE DISCLOSURE

The present disclosure is directed to stellarators and, in particular, stellarators incorporating one or more removable components. The stellarators incorporating the one or more removable components are adapted to confine a plasma, such as to confine a plasma within a void defined by one or more removable field shaping units. The present disclosure is also directed to assemblies including a stellarator having one or more removable components.

BACKGROUND OF THE DISCLOSURE

Fusion is a process which can be harnessed to release energy in abundant fuels, without emissions of greenhouse gases and with significantly lower and shorter-lived radioactive waste than conventional fission nuclear reactors. Fusion fuels fuse only at extremely high temperature, at which all materials are in the plasma state.

Magnetic fusion devices aim to confine a fusing plasma using magnetic fields. The two leading magnetic fusion approaches are the tokamak and the stellarator, both of which utilize a magnetic field which has the topology of a torus.

Stellarators have the advantage over tokamaks of operating in steady state and requiring no additional electrical current to be driven within the plasma itself. Prior stellarator designs have included non-planar electromagnetic coils which have a complex, 3D curvature. These electromagnetic coils make it difficult to remove components that are inward of the coils, as the spaces between them are small and oddly shaped. Some stellarator designs include electromagnetic coils which link other electromagnetic coils, akin to the links of a chain. These electromagnetic coils cannot be removed independently, as they interlock other coils.

One example of a stellarator employing complex electromagnetic coils is the Large Helical Device (LHD) experiment operated by the Japanese National Institute for Fusion Science (Yoshimura, Y., et al. 2005. Journal of Physics: Conference Series 25 (1): 189.). These electromagnetic coils are helical coils, which are non-planar and interlock the plasma and the other helical coils. These electromagnetic coils must be wound with electrical wire on-site and cannot be removed independently of other coils. Stellarators employing such electromagnetic coils are termed Torsatrons or Heliotrons.

Another example of a stellarator employing complex electromagnetic coils is the Wendelstein 7-X (W7-X) experiment operated by the German Max Planck Institute for Plasma Physics (Beidler, Craig, et al. 1990. Fusion Technology 17 (1): 148-68.). With reference to FIG. 1A, W7-X uses a combination of external planar coils 101 and modular coils 102. The external planar coils are planar 101, interlock the plasma, and do not interlock any other coils. The modular coils 102 are non-planar, interlock the plasma, and do not interlock any other coils. Stellarators employing these types of coils can be termed Heliases or, more generally, modular coil stellarators.

The National Compact Stellarator Experiment (NCSX) was a proposed experiment that was canceled during its construction. A few different designs were proposed (Neilson, G H, et al. 2000. In Proceedings of the 42nd Annual Meeting of the APS Division of Plasma Physics Québec City, Canada.). A proposed "saddle coil design" which utilized (i) Toroidal Field (TF) coils, which are planar coils that interlock the plasma, but which do not interlock any other coils; and (ii) saddle coils, which are non-planar coils that do not interlock the plasma, but do not interlock any other coils. An alternative design, referred to as the "optimized background coils and conformal coils design" utilized (i) background coils which are planar, interlock the plasma, and that interlock other background coils; and (ii) saddle coils, which are planar, do not interlock the plasma, and which do not interlock any other coils. Both of these designs allow only limited access to remove, maintain, and replace components inward of the coils.

The design of stellarators has had to make concessions to the accessibility, removability, maintainability, and replaceability of stellarator components. For instance, a stellarator is described by Waganer et. al., in which the modular coils restrict the accessibility of interior components only to small ports (Waganer, Lester M., Richard J. Peipert Jr., Xueren R. Wang, and Siegfried Malang. 2008. "ARIES-CS Maintenance System Definition and Analysis." Fusion Science and Technology 54 (3): 787-817. https://doi.org/10.13182/FST08-A1904). As a result, the blanket (a system interior to the stellarator) is divided into 200 modules, each of which is small enough to fit through a port. Furthermore, these modules are connected to a coolant manifold via pipes which must be cut in order to remove and maintain the modules.

Conversely, a tokamak design which demonstrates the benefits of accessibility of interior systems is described in Brown and Menard "Architectural Development of an ST Fusion Device." SSRN Scholarly Paper. Rochester, NY, Oct. 21, 2022. In this design, portions of blanket and plasma-facing components are removed through gaps between Toroidal Field (TF) coils, minimizing predicted downtime of the reactor. Tokamaks have simple coil designs and thereby facilitate the removal of interior system components. As a result, electrical current must be driven in the plasma itself. Stellarators on the other hand, do not require electrical current to be driven in the plasma itself, but the coil design is complicated making it difficult and economically unfeasible to remove any interior components. Prior stellarator designs, such as those described above, include coils which restrict the size of the largest component that can be removed.

Another design in the literature describes a stellarator which allows portions of blanket components to be removed as units: Brown et al. "Engineering Optimization of Stellarator Coils Lead to Improvements in Device Maintenance." In 2015 IEEE 26th Symposium on Fusion Engineering (SOFE), 1-6, 2015. This method, however, imposes the onerous constraint on the assumed modular coils that the radially outward legs of the coils must be straight and run vertically. This strongly limits the kinds of magnetic fields which may be produced by a stellarator and is not always possible.

BRIEF SUMMARY OF THE DISCLOSURE

Stellarators designed to-date have incredibly complex three-dimensional designs, which lead to increased costs and to difficulty controlling the distribution of the 3D magnetic field. Additionally, stellarators designed to-date exhibit difficulty in removing interior systems, which leads to increased costs and decreased availability. It would be desirable to develop a stellarator having a less complex design and which facilitates greater control of the generated magnetic field. It would also be desirable to develop a stellarator in which certain components are accessible for removal, maintenance, and replacement. The present disclosure solves these problems by providing a stellarator including removable and/or replaceable components, such as removable field shaping units and/or removable shaping coils.

A first aspect of the present disclosure is a stellarator comprising: (a) a field-shaping coil system defining a void adapted to confine a plasma, wherein the field-shaping coil system comprises a plurality of toroidal sectors, wherein each toroidal sector of the plurality of toroidal sectors includes at least one removable field shaping unit, wherein the at least one removable field shaping unit comprises: (i) one or more structural mounting elements; and (ii) one or more planar shaping coils disposed on a surface of the one or more structural mounting elements; and b) a plurality of encircling coils which encircle the field-shaping coil system. In some embodiments, at least a first toroidal sector of the plurality of toroidal sectors (i) is not surrounded by any one encircling coil of the plurality of encircling coils, and (ii) has a toroidal extent which is less than a toroidal extent between two encircling coils of the plurality of encircling coils which neighbor the at least the first toroidal sector.

In some embodiments, at least a first toroidal sector of the plurality of toroidal sectors (i) is positioned entirely between a first and a second encircling coil of the plurality of planar encircling coils, and (ii) has a toroidal extent which is less than a toroidal extent between the first and second encircling coils. In some embodiments, at least a first toroidal sector of the plurality of toroidal sectors comprises at least two removable field shaping units. In some embodiments, one or more planar shaping coils of a first removable field shaping unit of the at least two removable field shaping units are contained entirely within a perimeter of the first removable field shaping unit; and wherein one or more planar shaping coils of a second removable field shaping unit of the at least two removable field shaping units are contained entirely within a perimeter of the second removable field shaping unit.

In some embodiments, at least a first toroidal sector of the plurality of toroidal sectors comprises four or more removable field shaping units. In some embodiments, the plurality of planar encircling coils is comprised of one or more superconducting materials. In some embodiments, the plurality of planar encircling coils does not interlock with each other. In some embodiments, the plurality of planar encircling coils interlocks the plasma. In some embodiments, the at least one removable field shaping unit comprises between about 5 and about 100 shaping coils. In some embodiments, the at least one removable field shaping unit comprises between about 5 and about 50 shaping coils. In some embodiments, the one or more planar shaping coils are removable. In some embodiments, the one or more structural mounting elements are removable.

In some embodiments, the stellarator further comprises one or more controllers. In some embodiments, the stellarator further comprises one or more control coils and/or one or more saddle coils. In some embodiments, the one or more control coils and/or the one or more saddles coils are communicatively coupled to a controller.

In some embodiments, the field-shaping coil system further comprises a structural scaffolding. In some embodiments, the structural scaffolding has a pre-determined shape. In some embodiments, the structural scaffolding comprises a set of poloidal ribs and a set of toroidal ribs. In some embodiments, the structural scaffolding includes one or more curved or planar plates. In some embodiments, the structural scaffolding is adapted to support the at least one removable field shaping unit. In some embodiments, the structural scaffolding includes one or more flanges which are complementary to one or more flanges of the at least one removable field shaping unit.

In some embodiments, the stellarator further comprises at least one additional interior component. In some embodiments, the at least one additional interior component comprises one of a neutron breeding blanket, a first wall, a cryostat, or a neutron shielding. In some embodiments, the at least one additional interior component is removable.

A second aspect of the present disclosure is a stellarator comprising: (a) a field-shaping coil system including at least two removable field shaping units, the field-shaping coil system defining a void adapted to confine a plasma, wherein each of the at least two removable field shaping units comprise (i) one or more structural mounting elements; and (ii) one or more planar shaping coils disposed on a surface of the one or more structural mounting elements; and b) a plurality of planar encircling coils which encircle the field-shaping coil system; wherein a first of the at least two removable field shaping units is at least partially surrounded by a first planar encircling coil of the plurality of encircling coils; and wherein a second of the at least two removable field shaping units is positioned entirely between the first planar encircling coil and a second planar encircling coil of the plurality of encircling coils.

In some embodiments, a longitudinal distance between the first and second encircling coils is greater than a longitudinal dimension of the second removable field shaping unit.

In some embodiments, the plurality of planar encircling coils is comprised of one or more superconducting materials. In some embodiments, the plurality of planar encircling coils does not interlock with each other. In some embodiments, the plurality of planar encircling coils interlocks the plasma. In some embodiments, the one or more planar shaping coils are removable. In some embodiments, the one or more structural mounting elements are removable.

In some embodiments, the stellarator further comprises at least one of a neutron breeding blanket, a cryostat, and neutron shielding.

In some embodiments, the stellarator comprises at least four encircling coils. In some embodiments, one of the at least four encircling coils is planar.

In some embodiments, the stellarator further comprises at least one fixed field shaping unit, wherein the at least one fixed field shaping unit comprise (i) one or more structural mounting elements; and (ii) one or more planar shaping coils disposed on a surface of the one or more structural mounting elements. In some embodiments, the field-shaping coil system further comprises a structural scaffolding. In some embodiments, the structural scaffolding has a pre-determined shape. In some embodiments, the structural scaffolding comprises a set of poloidal ribs and a set of toroidal ribs. In some embodiments, a ratio of poloidal ribs to encircling coils ranges from between 1:1 to 4:1. In some embodiments, a ratio of toroidal ribs to encircling coils ranges from between 1:1 to 3:1. In some embodiments, the structural scaffolding is adapted to support the at least two removable field shaping units.

A third aspect of the present disclosure is a stellarator comprising: (a) a field-shaping coil system including at least two removable field shaping units, the field-shaping coil system defining a void adapted to confine a plasma, wherein each of the at least two removable field shaping units comprise (i) one or more structural mounting elements; and (ii) one or more planar shaping coils disposed on a surface of the one or more structural mounting elements; and b) a plurality of planar encircling coils which encircle the field-shaping coil system; wherein each of the at least two removable field shaping units are removable from the stellarator without having to reconfigure any one planar encircling coil of the plurality of planar encircling coils.

In some embodiments, a first of the at least two removable field shaping units is at least partially surrounded by first planar encircling coil of the plurality of encircling coils, wherein the first planar encircling coil prevents the first removable field shaping unit from being translated away from the void. In some embodiments, a second of the at least two removable field shaping units is positioned between the first planar encircling coil and a second planar encircling coil of the plurality of encircling coils, wherein the first and second planar encircling coils are neighboring encircling coils. In some embodiments, a longitudinal dimension of the second of the at least two removable field shaping units is less than a longitudinal dimension between the first and second planar encircling coils.

In some embodiments, the plurality of planar encircling coils is comprised of one or more superconducting materials. In some embodiments, the plurality of planar encircling coils does not interlock with each other. In some embodiments, the plurality of planar encircling coils interlocks the plasma. In some embodiments, the one or more planar shaping coils are removable. In some embodiments, the one or more structural mounting elements are removable.

In some embodiments, the stellarator further comprises at least one of a neutron breeding blanket, a cryostat, and neutron shielding. In some embodiments, the stellarator comprises at least four encircling coils. In some embodiments, one of the at least four encircling coils is planar.

In some embodiments, the stellarator further comprises at least one fixed field shaping unit, wherein the at least one fixed field shaping unit comprise (i) one or more structural mounting elements; and (ii) one or more planar shaping coils disposed on a surface of the one or more structural mounting elements. In some embodiments, the field-shaping coil system further comprises a structural scaffolding. In some embodiments, wherein the structural scaffolding has a predetermined shape. In some embodiments, the structural scaffolding comprises a set of poloidal ribs and a set of toroidal ribs. In some embodiments, a ratio of poloidal ribs to encircling coils ranges from between 1:1 to 4:1. In some embodiments, a ratio of toroidal ribs to encircling coils ranges from between 1:1 to 3:1.

A fourth aspect of the present disclosure is a method of removing one or more field shaping units from a stellarator without reconfiguring any one of a plurality of encircling coils, comprising: (a) obtaining a stellarator, wherein the stellarator comprises: (i) a field-shaping coil system defining a void adapted to confine a plasma, wherein the field-shaping coil system comprises a plurality of field shaping units, wherein at least two of the plurality of field shaping units are removable from the field-shaping coil system, wherein each field shaping unit of the plurality of field shaping units comprises one or more structural mounting elements and one or more planar shaping coils disposed on a surface of the one or more structural mounting elements; and (ii) a plurality of planar encircling coils which encircle the field-shaping coil system; wherein in the obtained stellarator, a first of the at least two removable field shaping units is initially at least partially surrounded by a first planar encircling coil of the plurality of encircling coils such that it cannot be translated outward away from the void; and a second of the at least two removable field shaping units is initially positioned entirely between the first planar encircling coil and a second planar encircling; (b) translating the second field shaping unit of the at least two removable field shaping units outward away from the void thereby removing the first field shaping unit from the stellarator without having to reconfigure either of the first or second encircling coils; (c) rotating and/or translating the first field shaping unit of the at least two removable field shaping units such that the first field shaping unit passes through the first encircling coil and at least partially into an area where the second field shaping unit of the at least two removable field shaping units was initially positioned; and (d) translating the first field shaping unit of the at least two removable field shaping units outward away from the area where the second field shaping unit was initially positioned, thereby removing the first field shaping unit from the stellarator without having to reconfigure either of the first or second encircling coils.

In some embodiments, a longitudinal distance between the first and second encircling coils is greater than a longitudinal dimension of the second removable field shaping unit. In some embodiments, the method further comprises a third removable field shaping unit, wherein the third removable field shaping unit is initially at least partially surrounded by the second encircling coil. In some embodiments, the method further comprises rotating and/or translating the third field shaping unit such that the third field shaping unit passes through the second encircling coil and at least partially into an area where the second field shaping unit was initially positioned. In some embodiments, the method further comprises translating the third field shaping unit outward away from the area where the second field shaping unit was initially positioned, thereby removing the third field shaping unit from the stellarator without having to reconfigure either of the first or second encircling coils.

In some embodiments, the stellarator further comprises at least one fixed field shaping unit. In some embodiments, the stellarator comprises at least four encircling coils. In some embodiments, the stellarator further comprises a structural scaffolding including one or more poloidal ribs and one or more toroidal ribs.

A fifth aspect of the present disclosure is a stellarator comprising: (a) a field-shaping coil system defining a void adapted to confine a plasma, wherein the field-shaping coil system comprises a plurality of toroidal sectors, wherein each toroidal sector of the plurality of toroidal sectors includes at least one removable field shaping unit, wherein the at least one removable field shaping unit comprises: (i) one or more structural mounting elements; and (ii) one or more planar shaping coils disposed on a surface of the one or more structural mounting elements; and b) a plurality of encircling coils which encircle the field-shaping coil system; wherein the at least one removable field shaping unit of each toroidal sector is removable from the stellarator without having to reconfigure any one planar encircling coil of the plurality of planar encircling coils.

BRIEF DESCRIPTION OF THE FIGURES

For a general understanding of the features of the disclosure, reference is made to the drawings. In the drawings, like reference numerals have been used throughout to identify identical elements.

FIG. 2A also illustrates that the plurality of encircling coils 230 encircle and interlock the plasma 200. FIG. 2A further illustrates that the field-shaping coil system 203 may include a removable field shaping unit 210. Additionally, FIG. 2A illustrates that one or more shaping coils 212 are removably mounted on a surface 215 of a structural mounting element 211. In the embodiment depicted, the shaping coils 212 are removably mounted such that they face the plasma 200. No individual shaping coil 212 of the one or more shaping coils 212 interlocks the plasma.

FIG. 2B further illustrates that the field-shaping coil system 203 may include a removable field shaping unit 210. As illustrated, this removable field shaping unit 210 may be removed (such as translated outward from the center of the field-shaping coils system 203 or outward and away from the void) without interference from either of the neighboring encircling coils 230A and 230B or without having to reconfigure either of the neighboring encircling coils 230A and 230B. Additionally, FIG. 2B illustrates that one or more shaping coils 212 are mounted such they face outward, i.e., in a direction opposite the plasma 200. Additionally, FIG. 2B illustrates that the one or more field shaping units 210 may comprise a removable external casing 219 to cover and protect the shaping coils 212.

FIG. 2C illustrates that the field-shaping coil system 203 may include a removable field shaping unit 210 including a plurality of shaping coils 212. FIG. 2C further illustrates that the shaping coils 212 may have a mean coil radius 208 which is smaller than a major radius of the plasma 207 and smaller than a minor radius of the plasma 206.

FIG. 2D illustrates that the one or more field shaping units 210 may comprise a removable external casing 219 to cover and protect the shaping coils 212.

FIG. 2E illustrates that the one or more field shaping units 210 may comprise a removable external casing 219 to cover and protect the shaping coils 212.

FIG. 5 further illustrates the location of one or more structural members 540 relative to the positioning of the encircling coils 530 and the field-shaping coil system 503. FIG. 5 additionally illustrates that one or more shaping coils 512 are removably mounted on a surface of a structural mounting element 515.

FIG. 6 further illustrates one criterion for the removability of a field shaping unit, namely that a field shaping unit 610 may be removed from the field shaping coil system 603 without reconfiguring the encircling coils 630A and 630B. In some embodiments, a distance between the two neighboring encircling coils is larger than one dimension of the removable field shaping unit. For example, in some embodiments, a longitudinal distance 622 between the two neighboring encircling coils 630A and 630B is larger than a longitudinal dimension of the removable field shaping unit 623. This facilitates the removal of the field shaping unit 610, such as by translating the field shaping unit 610 outward and away from the center of the field-shaping coil system or void without interference from either of the neighboring encircling coils 630A and 630B.

FIG. 9 further illustrates that each removable field shaping unit includes a plurality of shaping coils (which may be fixed or removable).

FIG. 11 further illustrates that each removable shaping coil 1112 may be removably fluidically coupled a neighboring removable field shaping unit through one or more fluid-carrying conduits 1121). FIG. 11 additionally shows that a shaping coil 1112 may be communicatively coupled to one or more neighboring shaping coils through one or more electrical leads 1129, where each of the one or more electrical leads may be disconnected from each shaping coil).

FIG. 13A illustrates that neighboring field shaping units include flanges to facilitate the removable coupling of neighboring field shaping units. FIG. 13B illustrates that neighboring field shaping units include butts to facilitate the removable coupling of neighboring field shaping units. FIG. 13C illustrates that neighboring field shaping units include overlaps having predetermined sizes and/or shapes to facilitate the removable coupling of neighboring field shaping units.

FIG. 16 further depicts that a field shaping unit 1610 may be removed without reconfiguring the encircling coils, exposing blanket units 1681 and first wall units 1691 which may also be removed from the blanket system 1680 and first wall system 1690 respectively without reconfiguring the encircling coils.

FIG. 22A shows a shaping coil 2212A which spans field shaping units 2210A and 2210B. In comparison, shaping coil 2212 is entirely positioned within field shaping unit 2210A. Field shaping units 2210A and 2210B may be removed without having to reconfigure any encircling; and without having to first remove any shaping coils.

DETAILED DESCRIPTION

Figure 1A:
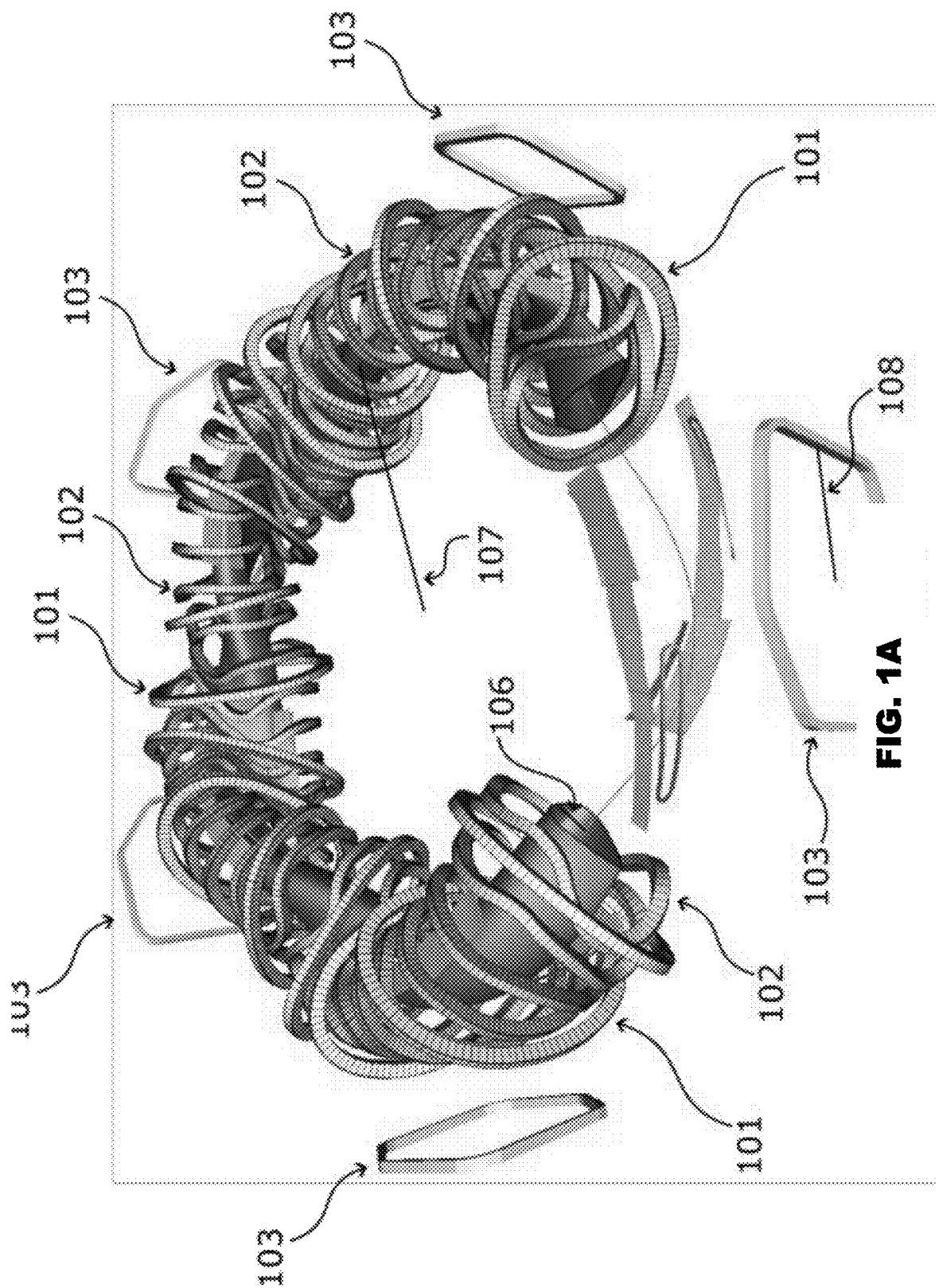
FIG. 1A depicts the components of the Wendelstein 7-X stellarator, and particularly the arrangement of the external planar coils, modular coils, and planar trim coils in relation to each other and relative to the confined plasma.
Figure 1B:
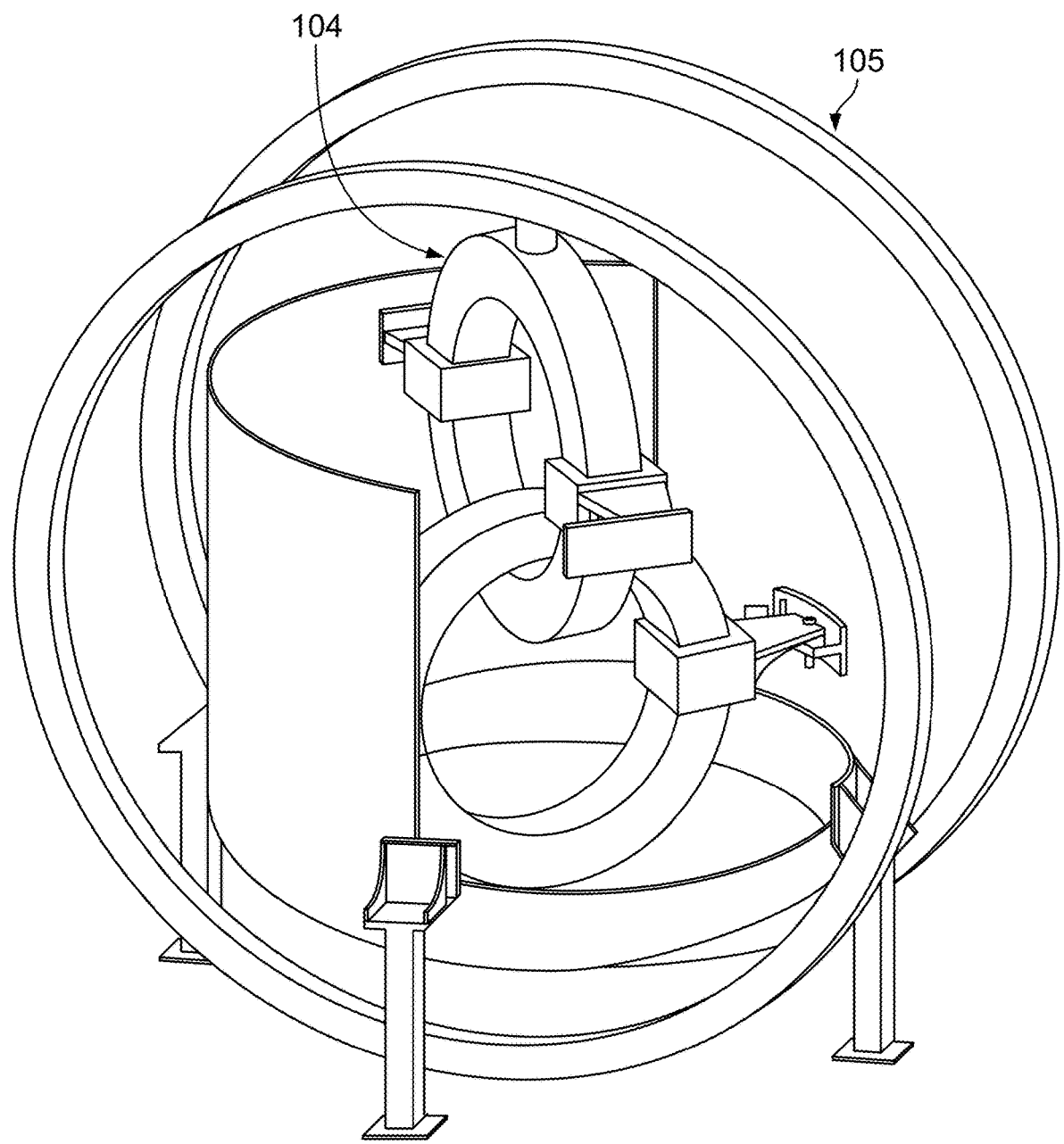
FIG. 1B depicts the components of the CNT stellarator and the arrangement of the IL and PF coils.

The present disclosure is directed to stellarators including one or more removable and/or replaceable components (e.g., one or more removable field shaping units); or systems or assemblies including a stellarator including one or more removable and/or replaceable components.

Definitions

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b, and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used herein, an object that "encircles" another object means that it interlocks or links with it, as do the links of a chain.

As used herein, a "neutronic blanket" is a component which captures the neutrons emitted when particles fuse within the plasma. The neutronic blanket encapsulates the plasma to the extent practical, to maximize the number of neutrons captured. In some embodiments, the neutronic blanket contains precursor isotopes (e.g., deuterium or lithium-6 or molybdenum-98) which are transmuted into a useful product isotope (e.g., tritium or tritium or modybdenum-99, respectively) upon neutron capture. Because the neutronic blanket is subjected to high fluxes of damaging neutrons, it may be short-lived and require periodic replacement.

As used herein, a "plasma-facing component" is a component which is directly exposed to a flux of particles or energy emitted by the plasma. In some embodiments, the plasma-facing components are exposed to high heat fluxes and/or high rates of erosion, and therefore may be short-lived and require periodic replacement.

As used herein, the term "topology" refers to whether an electromagnetic coil links, threads, or interlocks with another coil, in the manner of chain links. "Topology" may also refer to whether an electromagnetic coil interlocks the plasma or not.

Overview

Certain components of a stellarator or an assembly including a stellarator are "wear components." It is believed that these "wear components" will not last the entire lifetime of the stellarator and will require maintenance and/or replacement. Non-limiting examples of "wear components" include plasma-facing components and neutronic blankets. For this reason, removal, maintenance, and/or replacement of wear components is critical for a stellarator or an assembly including a stellarator to operate economically and with high availability over a long operating lifetime.

The complex magnet systems of stellarators typically impose stringent constraints on the accessibility of the components of a stellarator, including any "wear components." For instance, the encircling coils of a stellarator are often difficult to reconfigure. When operating, the encircling coils exert thousands of tons of force on each other and may not be allowed to move and/or deform by more than a few millimeters. Because of this, any structure supporting the encircling coils must be strong enough to withstand these forces and also stiff enough not to deform by more than this amount. For this reason, any structure supporting the encircling coils is typically designed to be permanent or semi-permanent. This makes spatial re-configuration of the encircling coils onerous.

Additionally, and from a thermal perspective, the encircling coils constitute many tons of cold mass that must be maintained at cryogenic temperature. To cool equivalent cold masses from room temperature in other experiments has taken upwards of a month. Because of this, it would be advantageous for the encircling coils to remain actively cooled while certain components of a stellarator, e.g., field shaping units, are removed, maintained, and/or replaced. This, it is believed, would minimize down-time, and maximize availability and economy.

In view of the foregoing, disclosed herein is a stellarator or an assembly including a stellarator which permits certain stellarator components, including any "wear components," to be accessed, maintained, removed, and/or replaced (collectively referred to as "removed" herein) without having to remove or reconfigure (collectively referred to as "reconfigure" herein) the one or more encircling coils of the stellarator. In the context of the present disclosure, to "reconfigure" an encircling coil refers to (i) physically moving an encircling coil; (ii) removing connections which carry fluids and/or electrical current to and/or from an encircling coil; (iii) permitting the temperature of or part of an encircling coil to increase from cryogenic, for example increase by more than about 20 K, such as more than about 50 K, such as more than about 100 K; (iv) removing power from the encircling coil; (v) detaching one or more structural supports or structural members from the encircling coil; and/or (vi) removing cryogens from the encircling coils (if included therein).

Field-Shaping Coil System

Figure 2A:
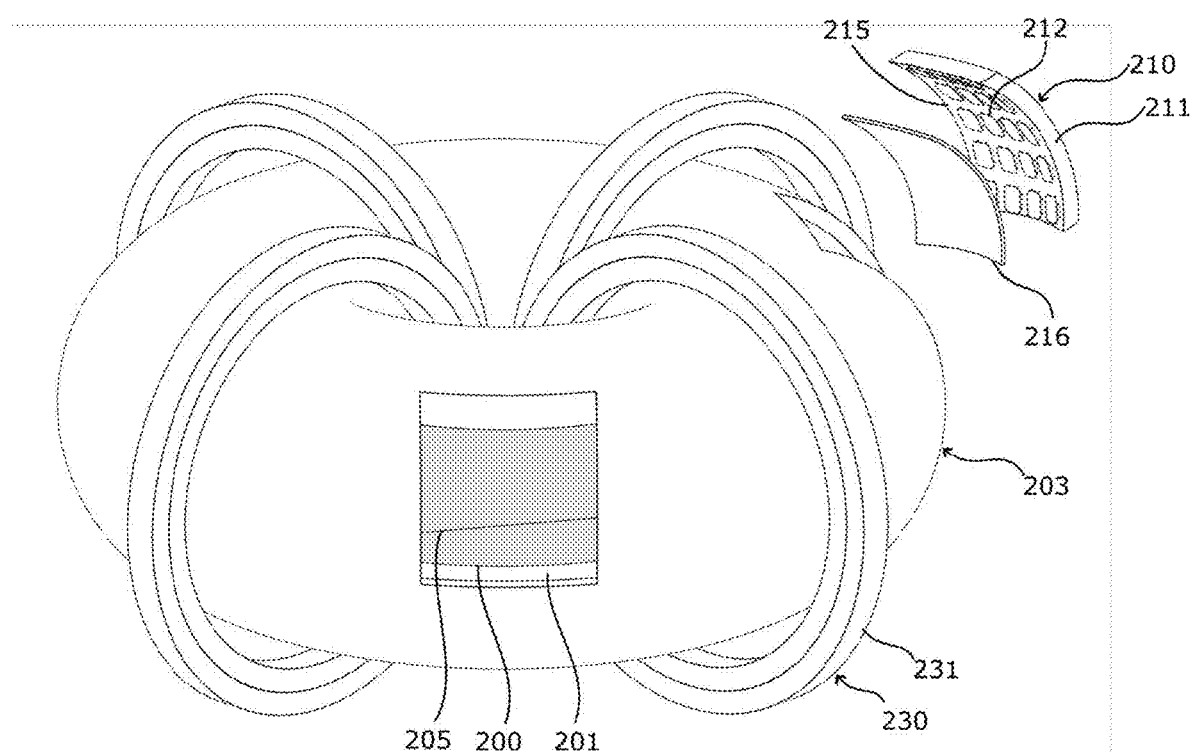
FIG. 2A illustrates a stellarator including a plurality of encircling coils 230 encircling and interlocking a field-shaping coil system 203.

With reference to FIGS. 2A-2E, stellarators of the present disclosure comprise a field-shaping coil system 203 which defines a void 201 that confines a plasma 200. In some embodiments, the field-shaping coil system 203 includes one or more components that are removable, hence (i) faciliating disassembly of the field-shaping coil system 203; and (ii) permitting replacement and/or maintenance of the constituent elements of the field shaping coil system 203, including any wear components. With reference to FIG. 2A, in some embodiments, the void 201 is configured such that a largest dimension from a plasma axis 205 of any contained plasma 200 to an outer edge of the contained plasma (not shown) is less than about 20 meters, such as less than about 10 meters, such as less than about 5 meters, such as less than about 4 meters, such as less than about 3 meters, such as less than about 2 meters, such as less than about 1 meter, such as less than about 0.5 meters, etc.

Figure 18:
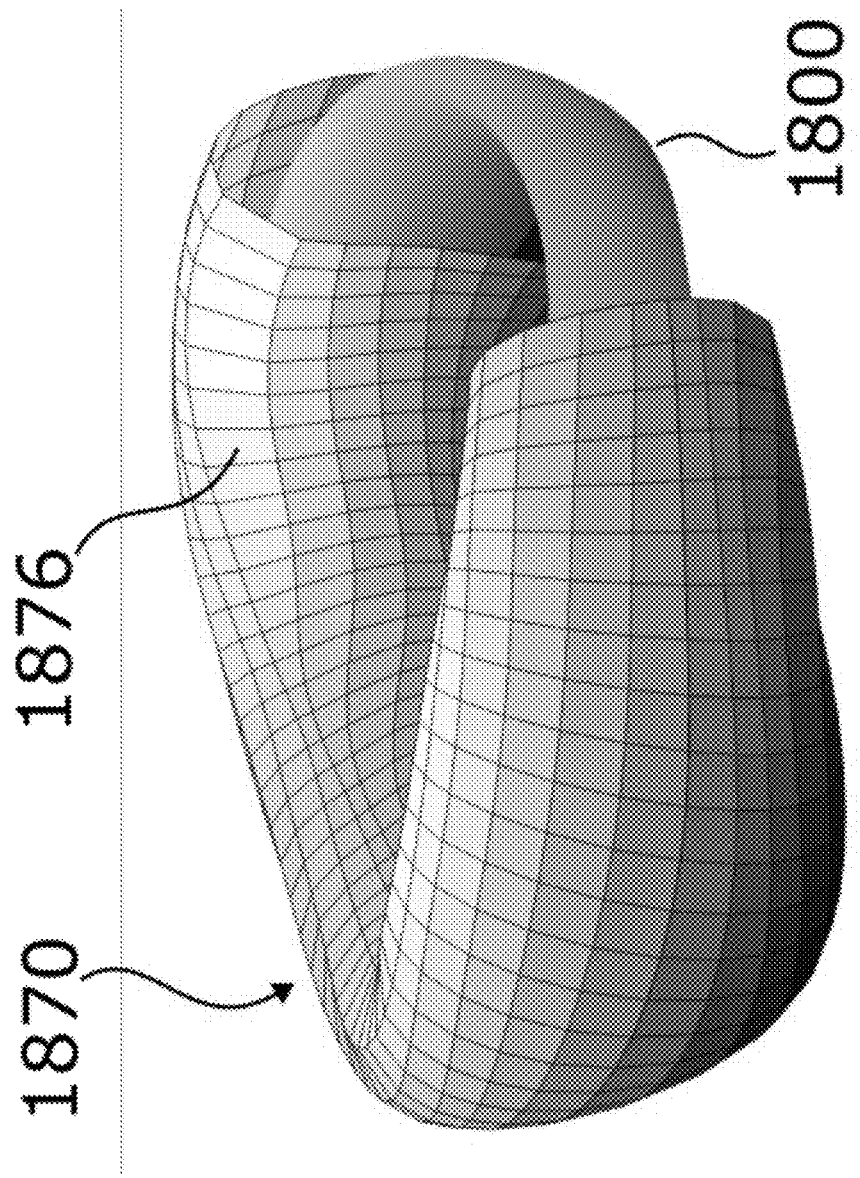
FIG. 18 illustrates a structural scaffolding 1870 comprising a plurality of plates 1876 which substantially conform to the surface of the plasma 1800.
Figure 19:
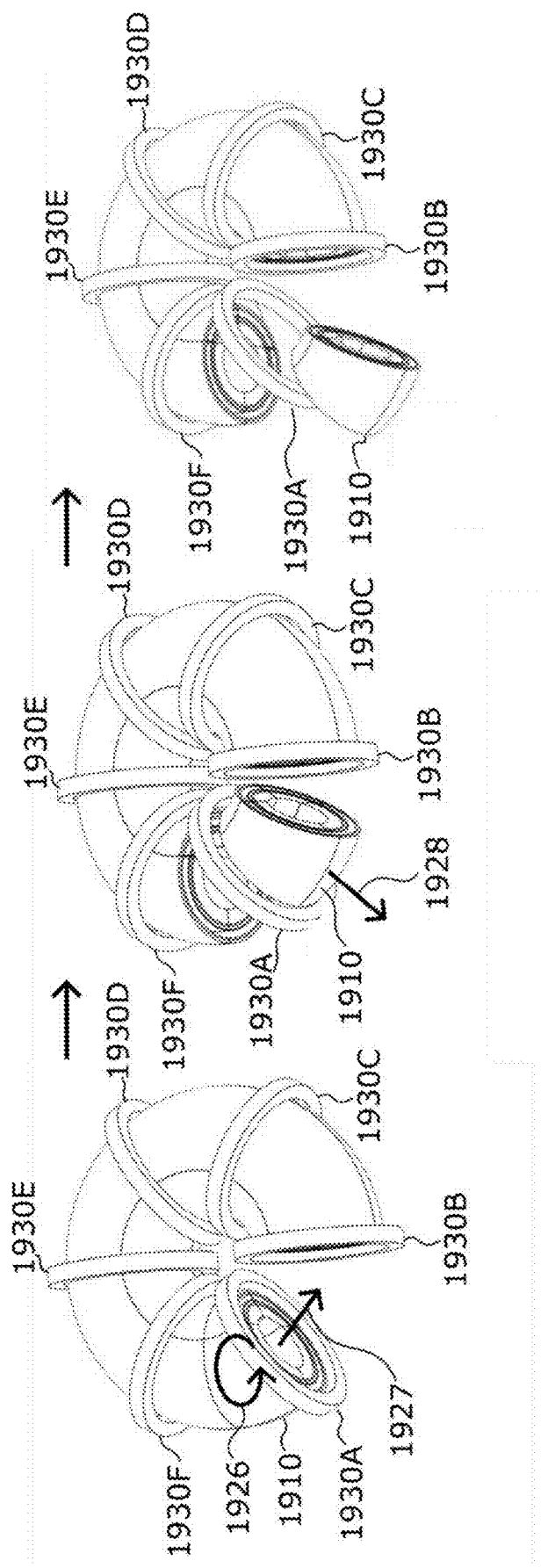
FIG. 19 provides a series of illustrates depicting the removal of a field shaping unit 1910 from a stellarator, where the removal of the field shaping unit includes combination of rotation 1926 and translation 1927, 1928 movements, ultimately permitting allows the field shaping unit 1910 to be removed without reconfiguring any encircling coils 1930A-F.
Figure 20:
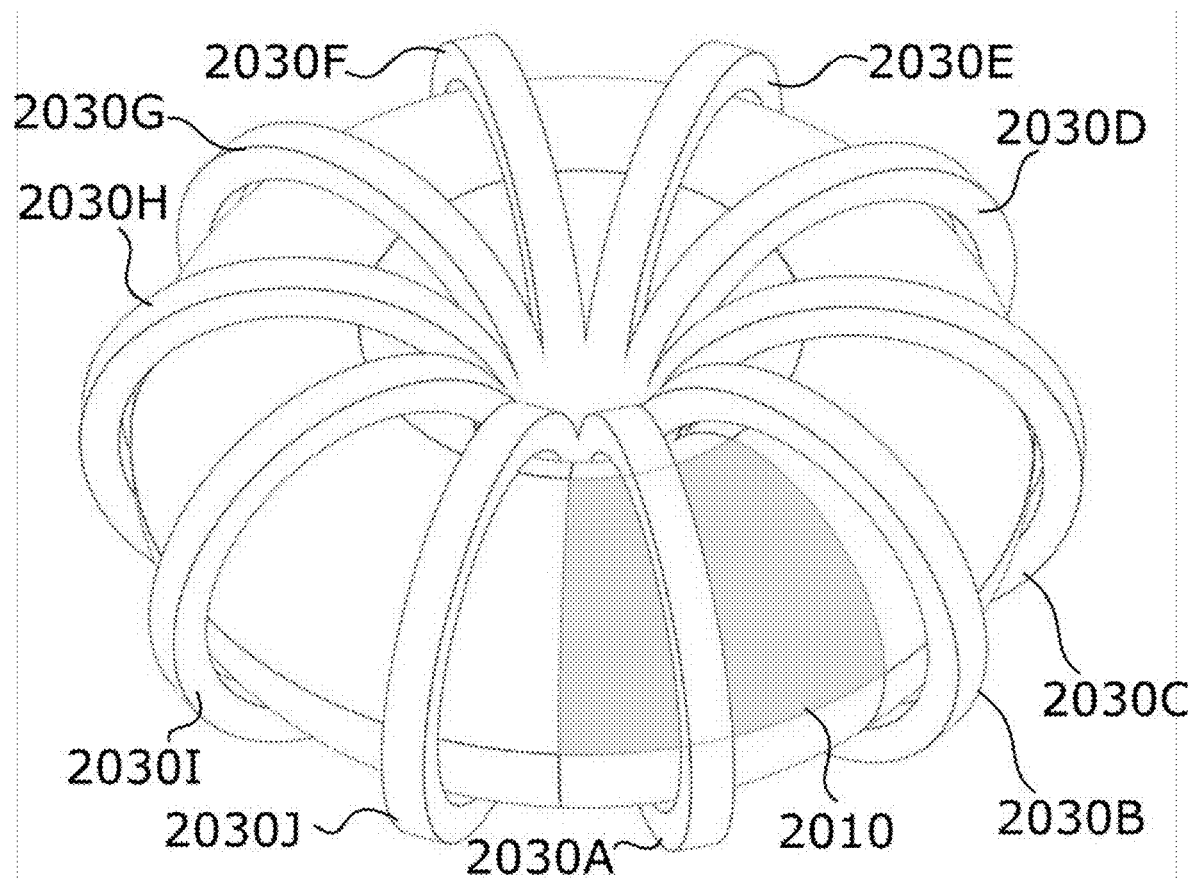
FIG. 20 illustrates a configuration of components of a stellarator in which no combination of rotation and translation may allow a field shaping unit 2010 to be removed without reconfiguring encircling coils 2030A-J (where the each of the encircling coils 2030A-J surround/encircle a field-shaping coil system). In this particular embodiment, a removable field shaping unit (included as part of the field-shaping coil system) is at least partially positioned behind encircling coil 2030A, such that the field shaping unit 2010 may not be removed by translating the field shaping unit 2010 directly outward and away from the center of the field-shaping coil system.
Figure 21:
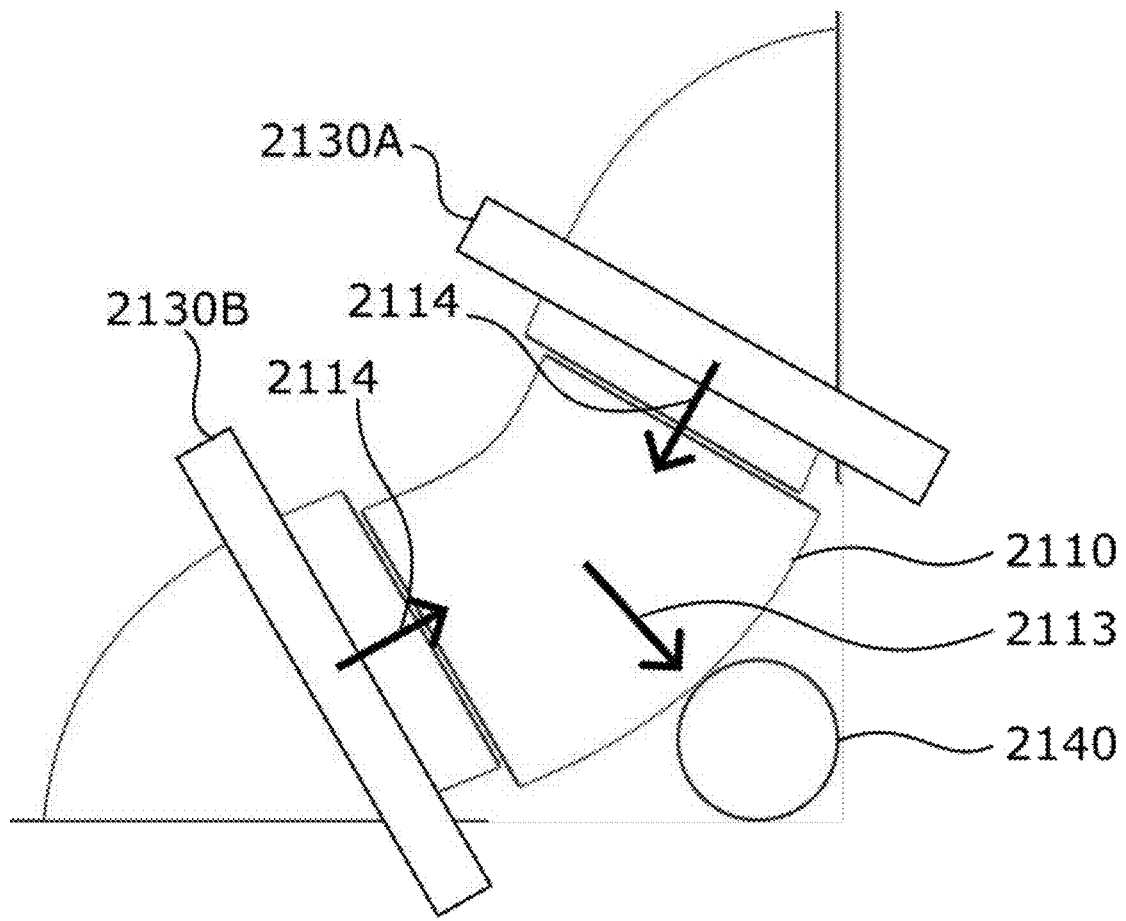
FIG. 21 illustrates a configuration of components of a stellarator which fails the dot-product criterion for the removability of field shaping units since, as depicted, the direct translation of a field shaping unit 2110 outward toward a center of a field-shaping coil system is impinged upon by the presence of a structural member 2140.

In some embodiments, the plasma 200 has a topology which substantially approximates that of a torus. In some embodiments, the plasma 200 is centered around a "plasma axis" 205, which is a magnetic field line that maps onto its own origin after one toroidal rotation. In some embodiments, the plasma axis 205 has a topology of a loop or one that substantially approximates a loop. In this regard, in some embodiments, a field-shaping coil system 203 approximates the topology of a torus but is not necessarily axisymmetric, such as depicted in FIGS. 10, 18, 21. In other embodiments, a field-shaping coil system 203 approximates the geometry of an axisymmetric torus, such as depicted in FIGS. 2, 5, 6, 7, 8, 9, 12, 14, 19, 20, 22, 23.

Field Shaping Units

The field-shaping coil system of the present disclosure is comprised of a plurality of field shaping units, where each field shaping unit is comprised of one or more structural mounting elements and one or more shaping coils. In some embodiments, each of the one or more shaping coils are mounted on a surface of the one or more structural mounting elements. For example, FIGS. 2A-2E depict a field-shaping coil system 203 including a field shaping unit 210, where the field shaping unit 210 includes a structural mounting element 211 have a surface 215 on which one or more shaping coils 212 are disposed. In some embodiments, the structural mounting elements 211 may be comprised of a metal or an alloy. In some embodiments, the structural mounting elements 211 are comprised of steel or a composite material (e.g., a fiberglass composite material). Shaping coils 212, such as planar shaping coils, are described further herein.

In some embodiments, the field-shaping coil system comprises at least 2 field shaping units, at least 3 field shaping units, at least 4 field shaping units, at least 5 field shaping units, at least 6 field shaping units, at least 7 field shaping units, at least 8 field shaping units, at least 9 field shaping units, at least 10 field shaping units, at least 12 field shaping units, at least 16 field shaping units, at least 20 field shaping units, at least 24 field shaping units, at least 30 field shaping units, at least 36 field shaping units, at least 48 field shaping units, at least 54 field shaping units, at least 60 field shaping units, at least 70 field shaping units, at least 80 field shaping units, at least 90 field shaping units, at least 100 field shaping units, at least 110 field shaping units, at least 120 field shaping units, at least 130 field shaping units, at least 150 field shaping units, at least 170 field shaping units, etc. where at least one field shaping unit of the plurality of field shaping units is a removable.

In some embodiments, the field-shaping coil system includes at least two removable field shaping units, such as at least three removable field shaping units, such as at least four removable field shaping units, such as at least eight removable field shaping units, such as at least twelve removable field shaping units, such as at least sixteen removable field shaping units, such as at least twenty removable field shaping units, etc. It is believed that the removability of one or more field shaping units facilitates access to one or more components (e.g., a neutronic blanket) within a stellarator or one or more components provided within a system or an assembly including a stellarator.

Figure 2B:
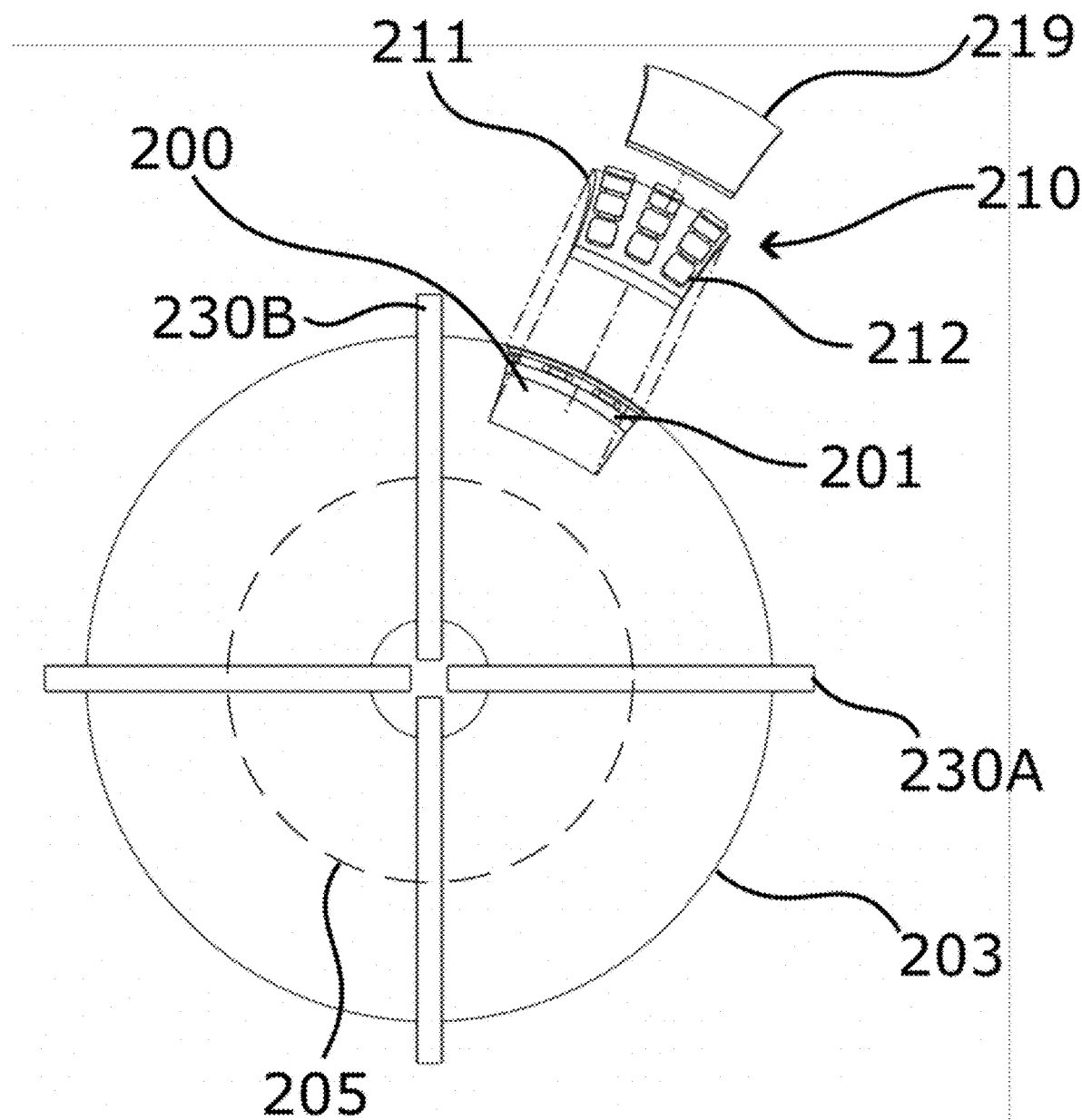
FIG. 2B illustrates a top-down view of a stellarator including a plurality of encircling coils 230A, 230B encircling and interlocking a field-shaping coil system 203.
Figure 2C:
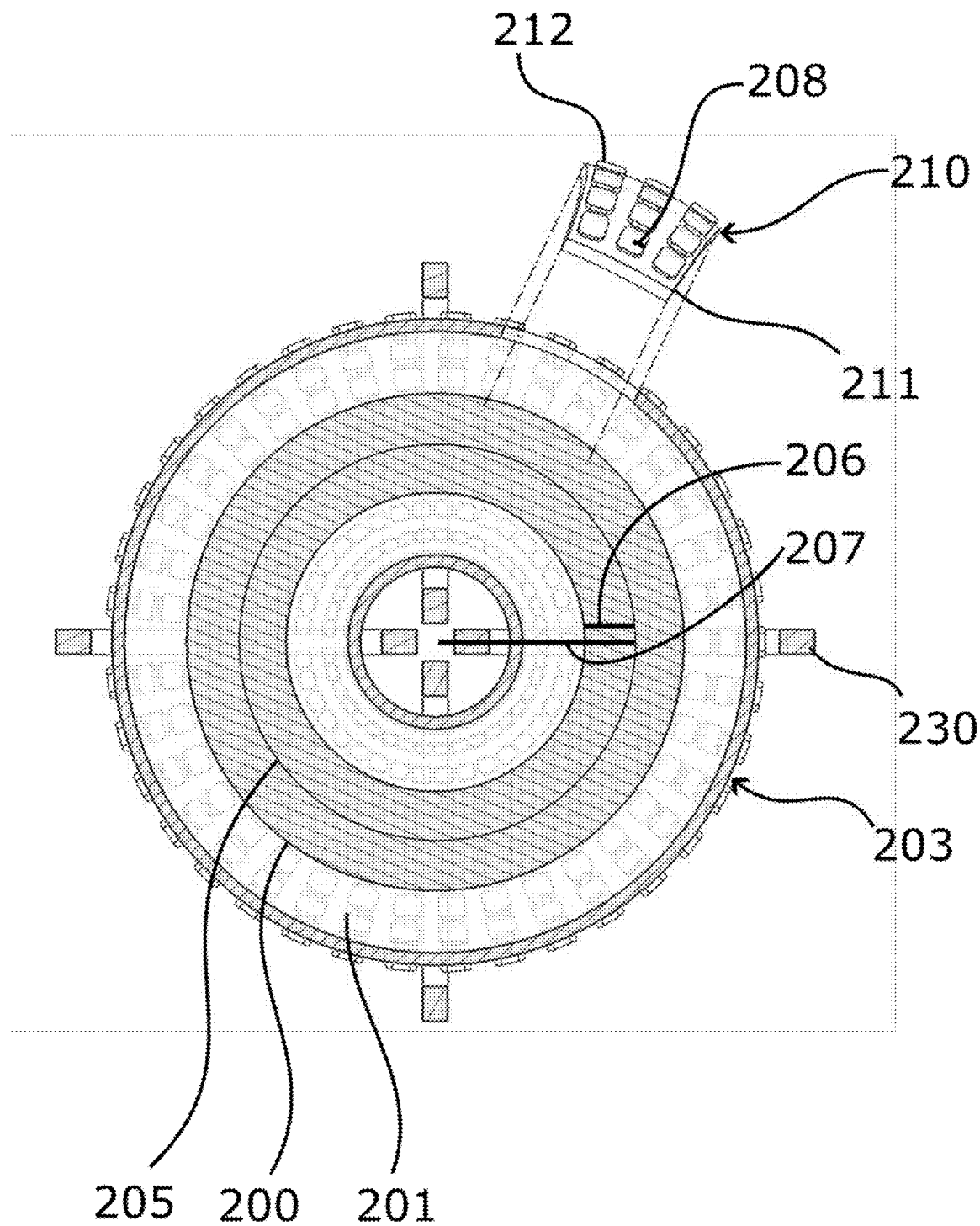
FIG. 2C illustrates a cross sectional view of a stellarator including a plurality of encircling coils 230 encircling and interlocking a field-shaping coil system 203.

In some embodiments, the one or more removable field shaping units may be removed from the field-shaping coil system without having to reconfigure any neighboring encircling coils. In some embodiments, the neighboring encircling coils of a field shaping unit include (i) the encircling coil which is encountered first as one traces a line in the positive plasma-axial direction, and (ii) the encircling coil which is encountered first as one traces a line in the negative plasma-axial direction. By way of example, FIG. 2B illustrates a field shaping unit 210 removed from the field-shaping coil system 203. In this embodiment, the field shaping unit 210 is removable from the field-shaping coil system 203 without having to remove or reconfigure neighboring encircling coils 230A and 230B.

Figure 23:
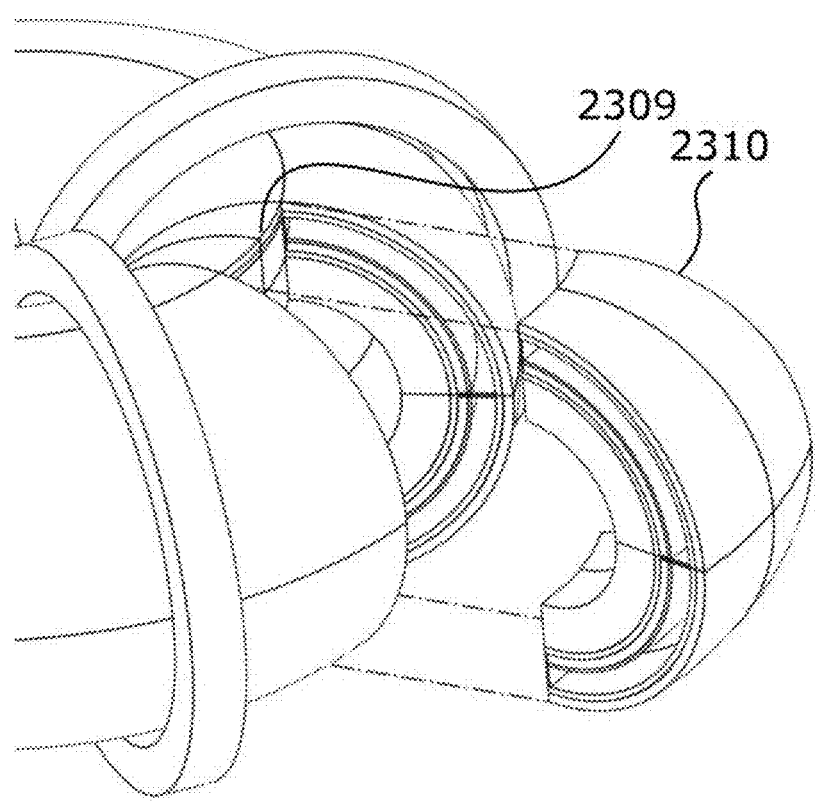
FIG. 23 shows a configuration of a portion of a stellarator comprising one or more removable field shaping units 2310 and one or more fixed, non-removable field shaping unit 2309.

In some embodiments, all of the field shaping units of the field-shaping coil system are removable. In other embodiments, the field-shaping coil system includes both fixed and removable field shaping units. By way of example, a field-shaping coil system may include both one or more fixed field shaping units and one or more removable field shaping units, where the one or more fixed and the one or more removable field shaping units may have any configuration and/or arrangement relative to each other. By way of example, FIG. 23 illustrates a field-shaping coil system which includes a combination of fixed 2309 and removable field shaping units 2310. In particular, FIG. 23 illustrates that a radially outward field shaping unit 2310 is removable; while a radially inward field shaping unit 2309 is fixed.

Figure 6:
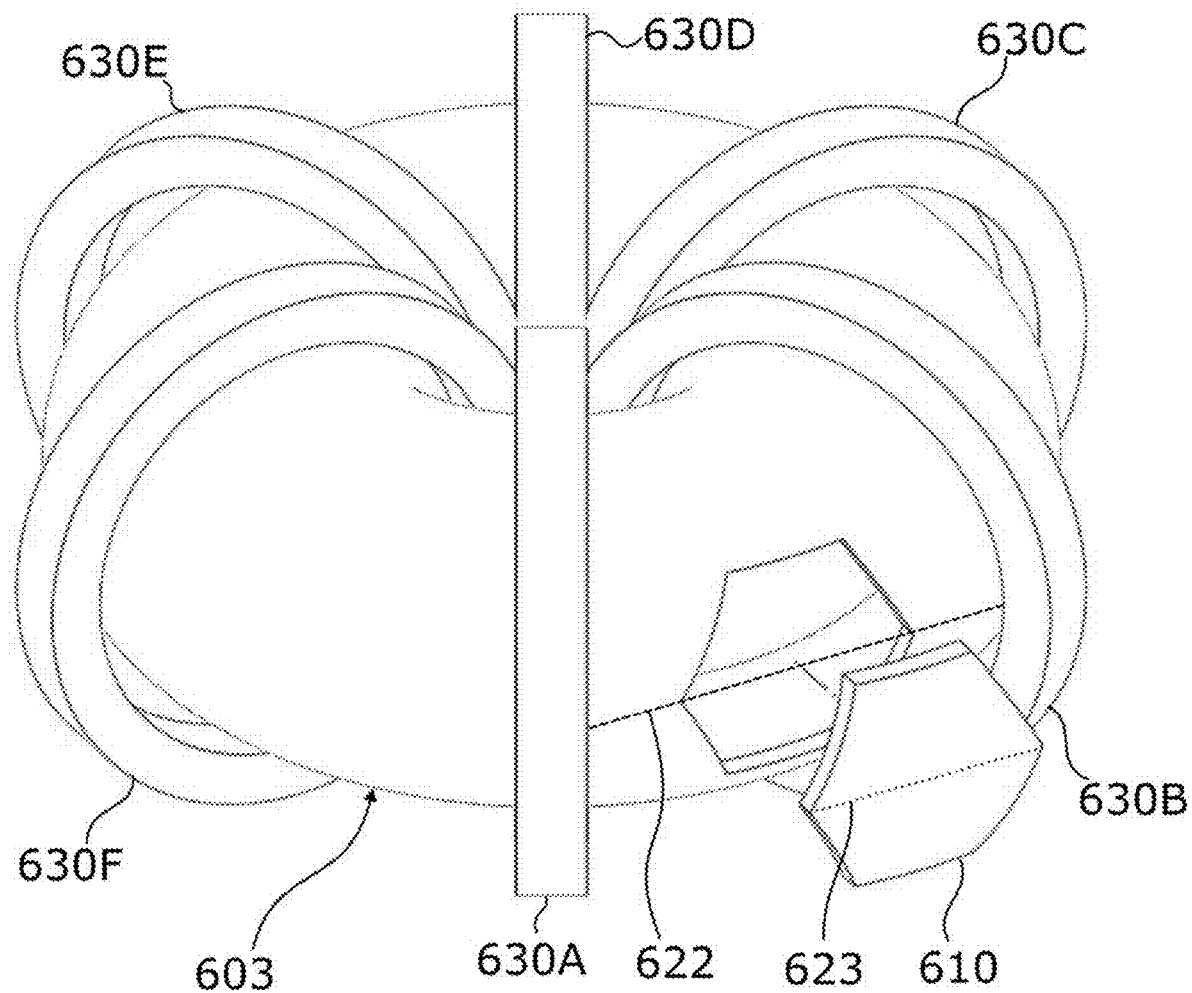
FIG. 6 illustrates a stellarator including six encircling coils (630A-630F) and at least one removable field shaping unit in accordance with one embodiment of the present disclosure.

Each field shaping unit may independently have any size and shape, provided that each removable field shaping unit may be removed through translation, rotation, or some combination of translation and/or rotation through space without interfering with any nearby encircling coil or other structure (e.g., structural scaffolding or structural member). With reference to FIG. 6, in some embodiments, each removable field shaping unit 610 in any field-shaping coil system 603 is shaped such that any one dimension 623 (dotted line) of the field shaping unit 610 is smaller than a maximum separation 622 (dashed line) between any two nearest encircling coils 630A and 630B.

In those embodiments where an individual field shaping unit is not encircled or surrounded by an encircling coil, that individual field shaping unit may be translated out of the field-shaping coil system, e.g., outward and away from the center of the field-shaping coil system or void. This is depicted in FIG. 6 which shows a field shaping unit 610 having a dimension 623 which is less than the maximum separation 622 between two neighboring encircling coils. In comparison, FIG. 20 illustrates a field shaping unit 2010 which cannot be translated away from the center of the field-shaping coil system since its direct translation outward would be blocked at least by encircling coil 2030A.

In those embodiments where any individual field shaping unit is at least partially encircled or surrounded by an encircling coil, the individual field shaping unit may be removed by translating and/or rotating that individual field shaping unit along the plasma axis until the encircling coil no longer encircles it, then by translating it out of the field-shaping coil system. An example of a field shaping unit that may be removed through a combination of translation and/or rotation is depicted in FIG. 19. FIG. 19 depicts a stellarator including a field-shaping coil system in which a field shaping unit has already been removed, such as removed from between neighboring encircling coils 1930A and 1930B. FIG. 19 further depicts that the field shaping unit to be removed 1910 is initially encircled or surrounded by an encircling coil 1930A (FIG. 19, left). However, through a combination of rotation around the vertical axis 1926 and translation in the toroidal direction 1927, the field shaping unit 1910 can be freed from the encircling coil 1930A (FIG. 19, left). Field shaping unit 1910 can then be removed by a radial translation 1928 (FIG. 19, center) from between the two encircling coils 1930A and 1930B. FIG. 19 (right) shows the freed field shaping unit 1910. In this embodiment, no encircling coils 1930A-F were reconfigured during the removal of field shaping unit 1910.

Toroidal Sectors

Figure 7A:
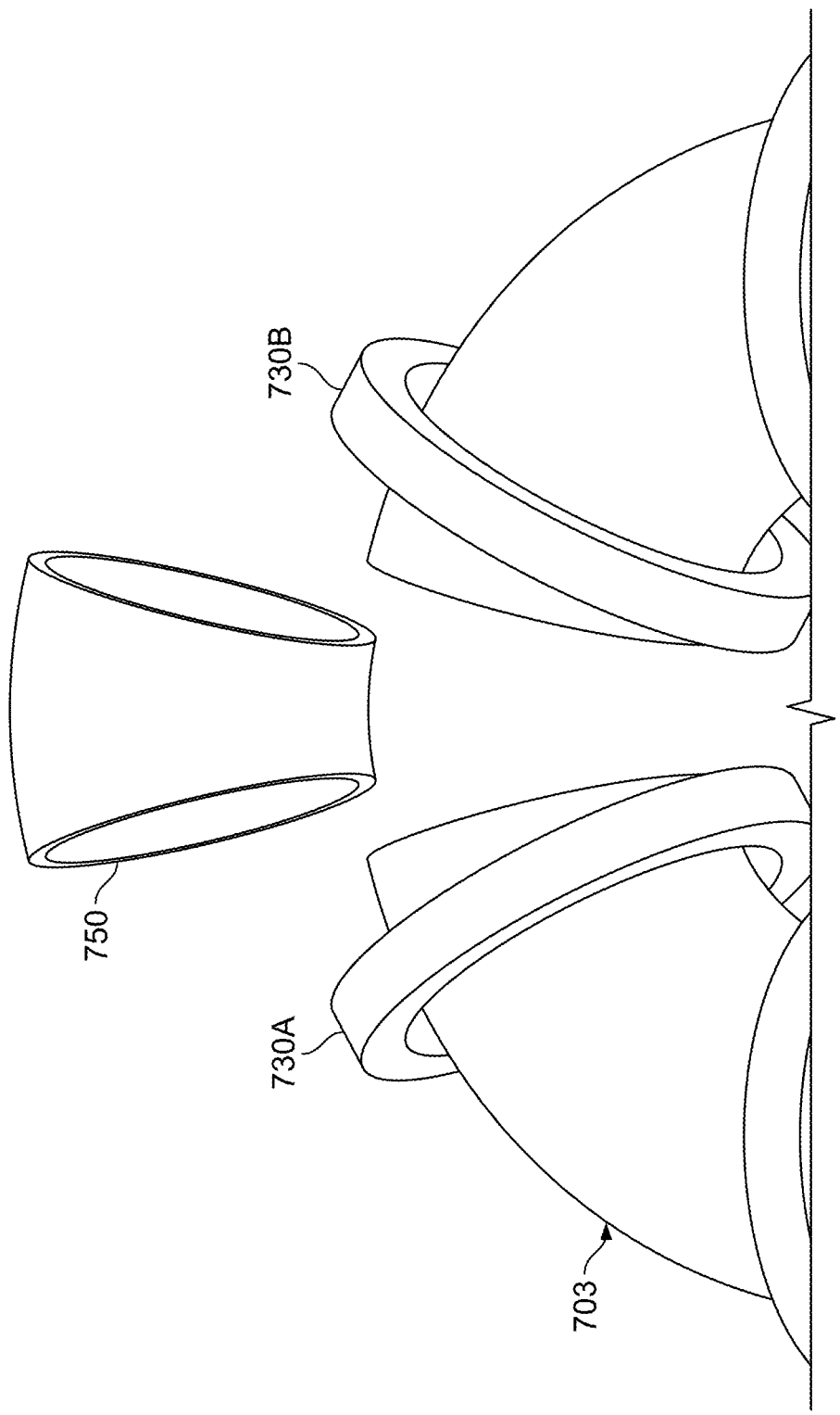
FIG. 7A depicts a stellarator including a toroidal sector 750 comprising one or more field shaping units (not depicted) in accordance with one embodiment of the present disclosure. This figure illustrates that the toroidal sector 750 is removable from the field shaping coil system 703 without reconfiguring the encircling coils 730A and 730B.

In some embodiments, the field-shaping coil system is divided into one or more toroidal sectors (e.g., 2 or more, 4 or more, 6 or more, 8 or more, 12 or more, 16 or more, 20 or more, etc. toroidal sectors) where each toroidal sector of the one or more toroidal sectors includes at least one removable field shaping unit. For instance, FIG. 7A illustrates a field-shaping coil system 703 which includes a toroidal sector 750. The toroidal sector 750 is shown removed from the a field-shaping coil system 703, where its removal is not impinged upon by the neighboring encircling coils 730A and 730B.

Figure 7B:
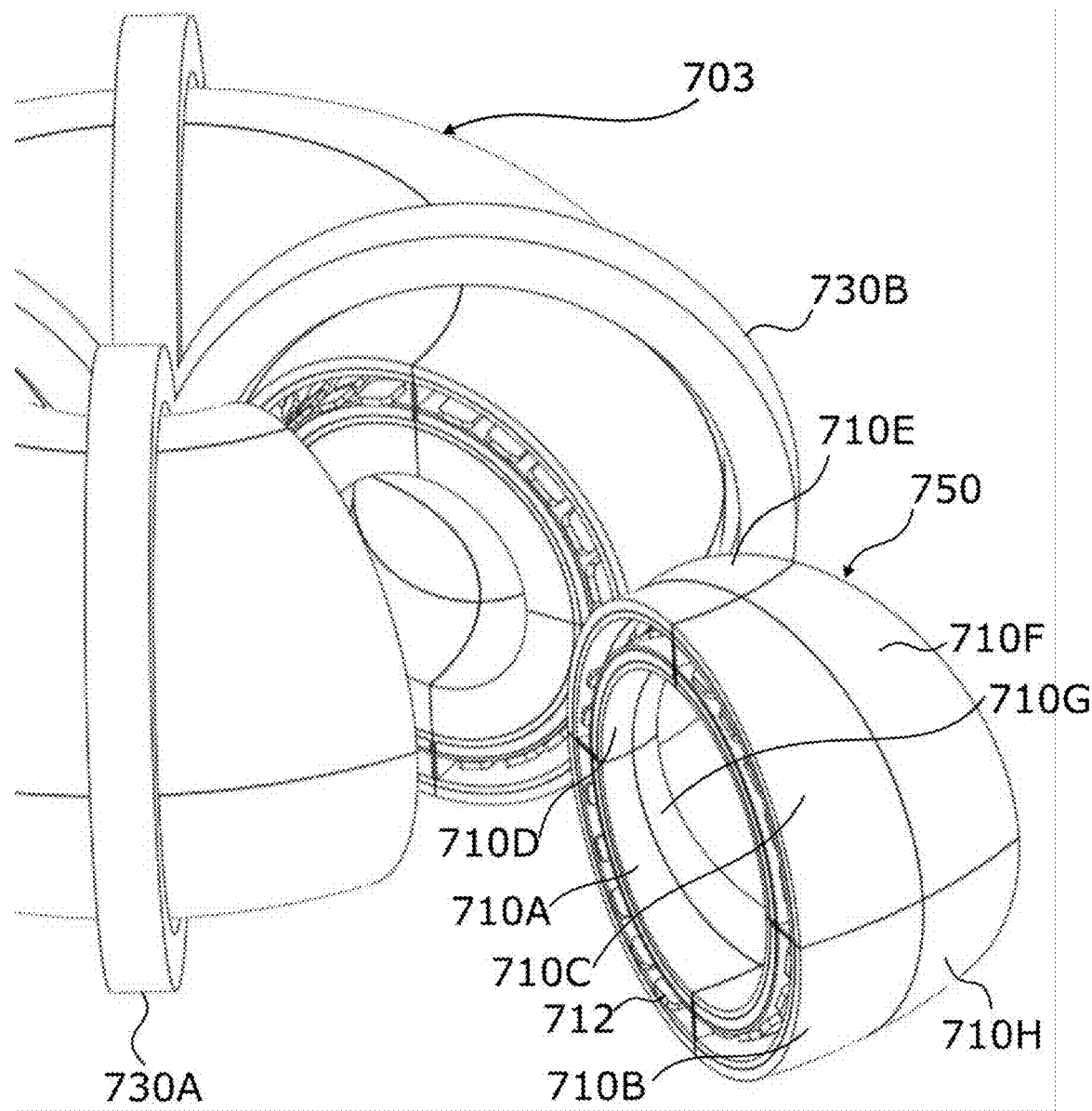
FIG. 7B depicts a stellarator including a toroidal sector 750 comprising one or more field shaping units in accordance with one embodiment of the present disclosure. This figure illustrates that the toroidal sector 750 is removable from the field shaping coil system 703 without reconfiguring the encircling coils 730A and 730B. The figure further illustrates that the toroidal sector 750 may be comprised of a plurality of field shaping units (710A-710H), such as 8 removable field shaping units. Each removable field shaping unit (710A-710H) comprises one or more removable shaping coils 712, such as one or more shaping coils 712 mounted such that they face a void or plasma.

In some embodiments, the one or more toroidal sectors include only one removable field shaping unit. In other embodiments, the one or more toroidal sectors include two or more removable field shaping units, such as 4 or more, 6 or more, 8 or more, 12 or more, 16 or more, 20 or more, etc. removable field shaping units. For example, FIG. 7B illustrates a toroidal sector 750 including a plurality of removable field shaping units (710A-710H), where each field shaping unit includes one or more shaping coils 712. Specifically, the toroidal sector 750 in FIG. 7B is shown removed from the field-shaping coil system 703, where the neighboring encircling coils 730A and 730B do not interfere with the removal of the toroidal sector 750.

Figure 8:
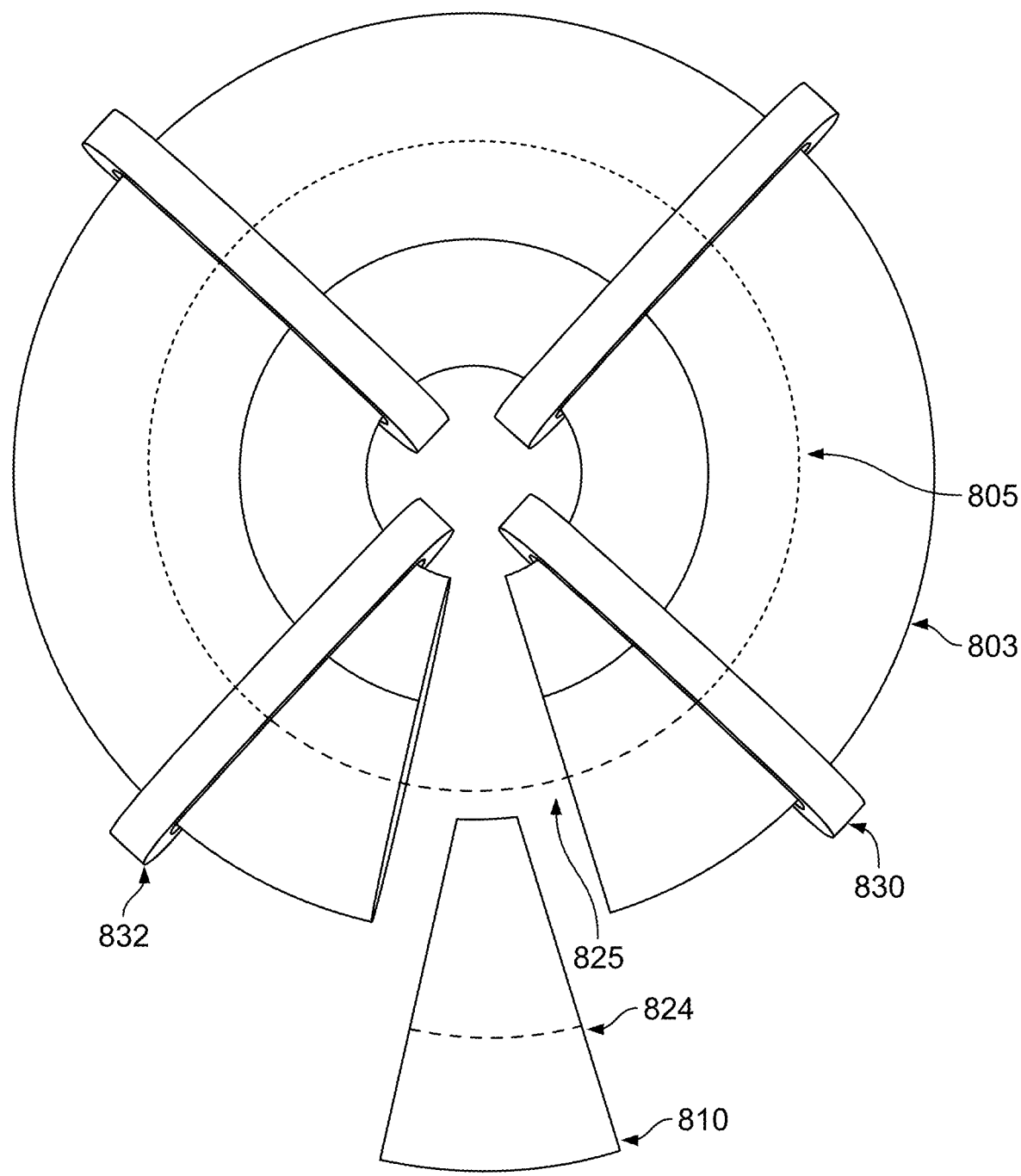
FIG. 8 illustrates a plurality of encircling coils 832 and 830 encircling and interlocking field-shaping coil system for containing a plasma having a plasma axis 805. These figures illustrate that a toroidal sector 810 has a dimensional path 824 along the plasma axis which is less 824 than a dimensional path 825 along the plasma axis between any two encircling coils 832 and 830, such that the toroidal sector 810 (and any field shaping units included within that toroidal sector 810) may be removed from the field-shaping coil system without reconfiguring any neighboring encircling coils 832 and 830.

FIG. 8 further illustrates that a toroidal sector 810 may be removed from a field-shaping coil system 803 without reconfiguring any neighboring encircling coils 830 and 832, provided that a "toroidal extent" of the toroidal sector 810 is less than a "toroidal extent" between the neighboring encircling coils 830 and 832. As used herein, a "toroidal extent" of a component is the path length along a plasma axis 805 (dotted line). As illustrated in FIG. 8, the toroidal extent 824 of the toroidal sector 810 is less than the toroidal extent 825 between encircling coils 830 and 832, thereby permitting the toroidal sector 810 to be translated away from the field-shaping coil system 803 without having to reconfigure encircling coils 830 and 832.

In some embodiments, the field-shaping coil system is divided into one or more toroidal sectors where each toroidal sector includes at least two removable field shaping units (e.g., 3 or more, 4 or more, 5 or more, 6 or more, 7 or more, 8 or more, 9 or more, etc. removable field shaping units), where the aggregate of the at least two removable field shaping units in each toroidal sector define the shape of the toroidal sector. In these embodiments, the at least two removable field shaping units that constitute each of the one or more toroidal sectors may be removed (together or each independently) from the field-shaping coil system without reconfiguring any adjacent or neighboring encircling coils. In some embodiments, a toroidal sector including at least two removable field shaping units has the same toroidal extent criterion noted above, allowing for the aggregate of field shaping units constituting any one toroidal sector to be removed from the field-shaping coil system without reconfiguring the encircling coils.

Figure 9:
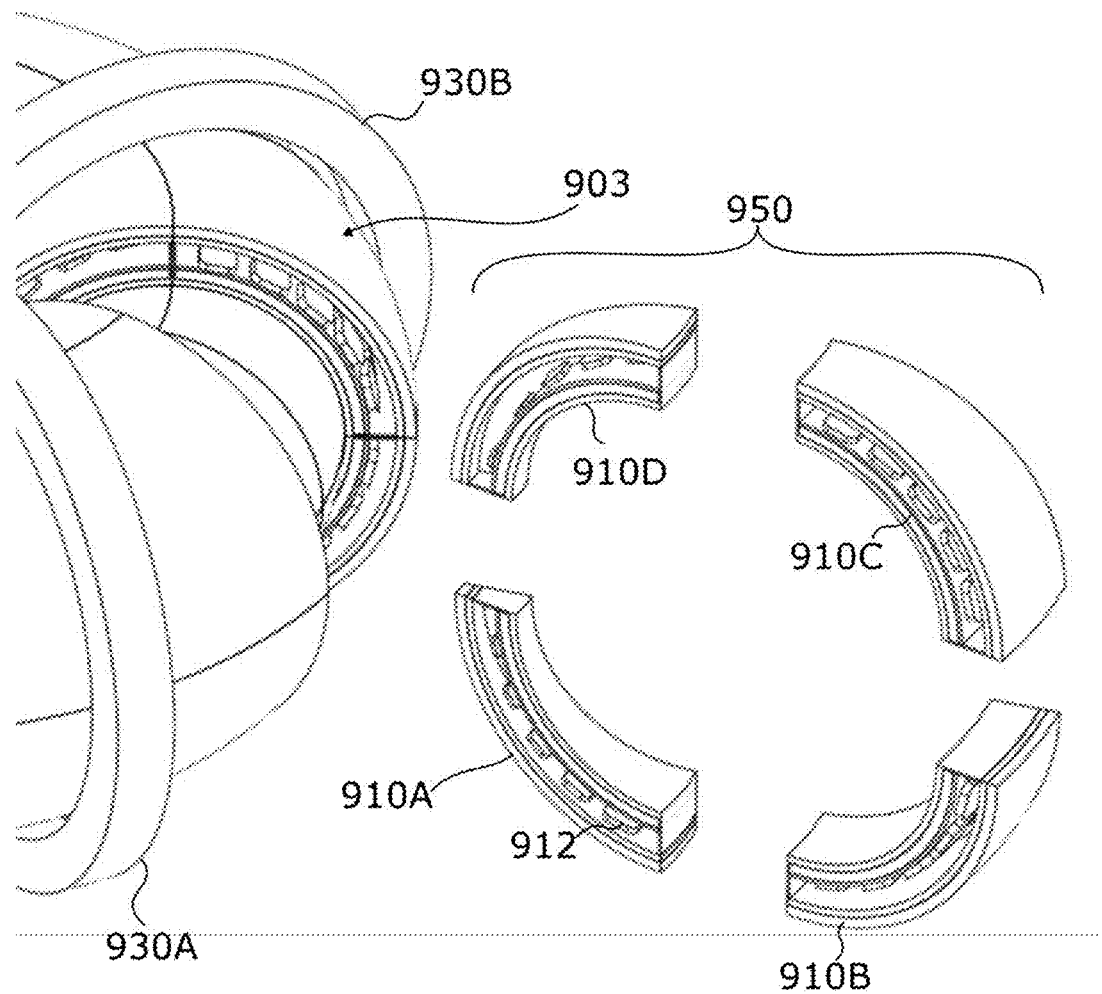
FIG. 9 depicts a portion of a stellarator including a toroidal sector 950 including four removable field shaping units 910A-910D. Each of the four removable field shaping units 910A-910D approximate a poloidal sector or poloidal arc; where each of the four poloidal sectors define, in the aggregate, the toroidal sector 950. In some embodiments, the entire toroidal sector 950 may be removed from the field-shaping coil system 903, i.e., each of the field shaping units 910A-910D that define the toroidal sector 950 may be removed (independently or in the aggregate) from the field-shaping coil system 903 without removing or reconfiguring any adjacent encircling coils 930A, 930B.
Figure 10:
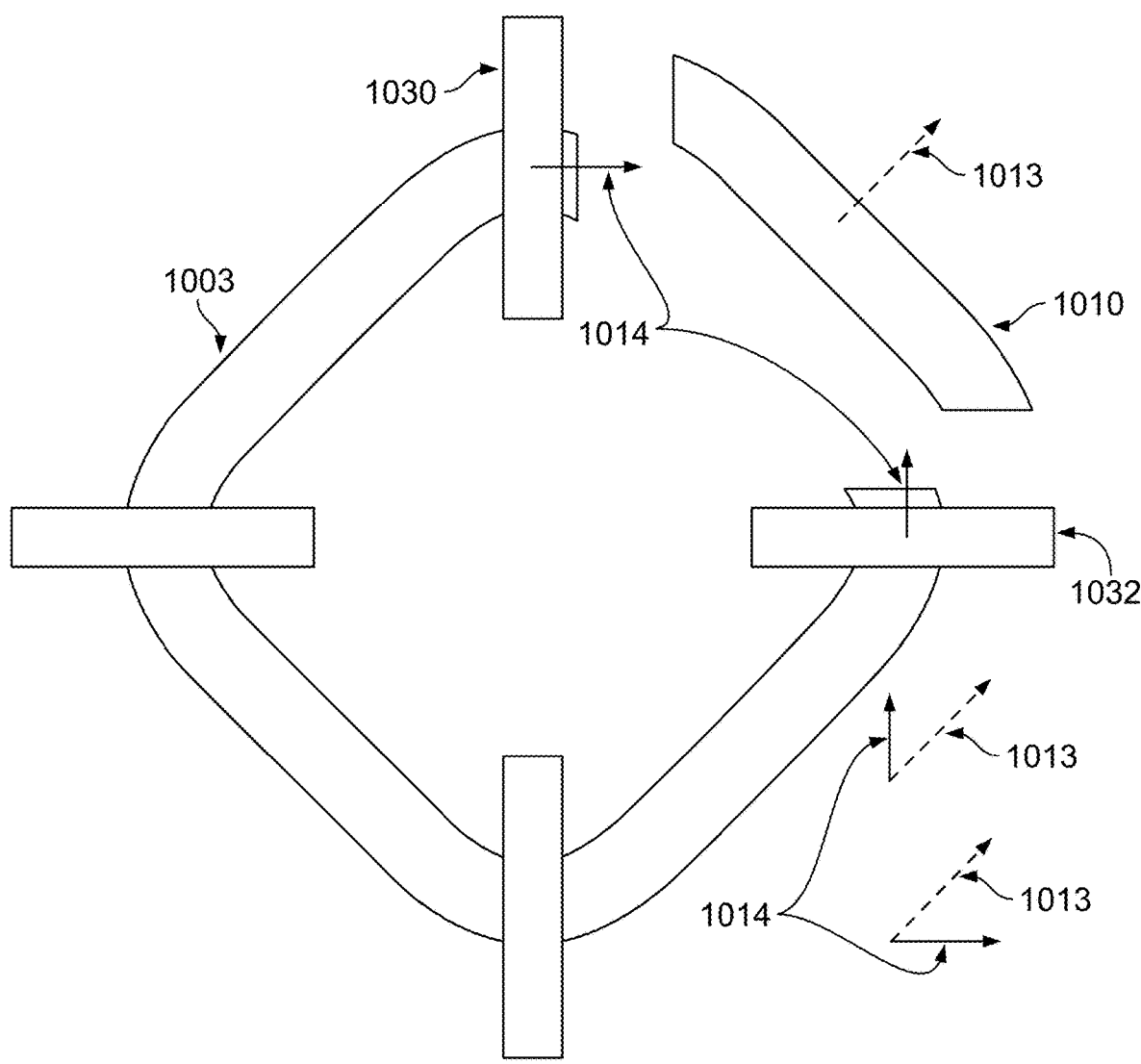
FIG. 10 depicts a field shaping unit 1010 with a shape that approximates a toroidal sector, where the field shaping unit 1010 is shown as removed from the field shaping coil system 1003 without reconfiguring the encircling coils 1030. The direction of translation for field shaping unit removal 1013 has positive dot products with the field shaping unit-directed normal vectors 1014 from the encircling coils.

In some embodiments, and with reference to FIG. 9, the field-shaping coil system 903 is divided into one or more toroidal sectors 950 where each toroidal sector 950 includes at least four removable field shaping units 910A-910D, where the aggregate of the at least four removable field shaping units 910A-910D in each toroidal sector 950 define the shape of the toroidal sector 950. In these embodiments, the at least four removable field shaping units 910A-910D that constitute each of the one or more toroidal sectors 950 may be removed (together or each independently) from the field-shaping coil system without removing any adjacent or neighboring encircling coils 930A and 930B. In some embodiments, each of the at least four removable field shaping units 910A-910D that constitute each of the one or more toroidal sectors 950 subtend approximately equal poloidal arcs or substantially equal poloidal arcs.

In some embodiments, the field-shaping coil system is divided into one or more toroidal sectors where each toroidal sector includes at least eight removable field shaping units, where the aggregate of the at least eight removable field shaping units in each toroidal sector define the shape of the toroidal sector. In these embodiments, the at least eight removable field shaping units that constitute each of the one or more toroidal sectors may be removed (together or each independently) from the field-shaping coil system without removing any adjacent or neighboring encircling coils.

In some embodiments, the encircling coils and field-shaping coil system are designed such that the dot products between the direction that one or more field shaping units are translated to remove them and the field shaping unit-pointing normal vectors of the two nearest encircling coils is positive (see, e.g., FIG. 10). In some embodiments, the encircling coil system is designed such that the allowable translation vectors (by the dot product criterion above) are not blocked by another component, such as a central bucking structure. By way of example, FIG. 10 illustrates a toroidal sector including a single field shaping unit 1010 removed from the field shaping coil system 1003 without reconfiguring the encircling coils 1030 and 1032. In some embodiments, the direction of translation for field shaping unit 1010 removal 1013 has positive dot products with the field shaping unit-directed normal vectors 1014 from the neighboring encircling coils 1030, 1032.

With reference to FIG. 21, a configuration is shown which fails this dot product criterion. A field shaping unit 2110 is shown with two neighboring encircling cois 2130 and 2132 and a structural member 2140. The field shaping unit-pointing normal vectors of the encircling coils 2114 point inwards. An allowable translation vector for field shaping unit removal is shown 2113. Allowed translation vectors are all toward the structural member 2140, and therefore this field shaping unit fails the dot product criterion.

Removability of the Constituent Components of the Field Shaping Units

In some embodiments, the constituent components of the one or more removable field shaping units are also removable. For instance, one or more structural mounting elements and/or one or more shaping coils (e.g., planar shaping coils) included as part of the one or more removable field shaping units may be removable. For instance, the one or more structural mounting elements 211 are each independently removable from the removable field shaping unit 210 of which they are a constituent part. In some embodiments, each field shaping unit 210, whether removable or fixed, comprises a single removable structural mounting element 211 (see, e.g., FIGS. 2B, 2D, and 2E). In other embodiments, each field shaping unit, whether removable or fixed, comprises two structural mounting elements, where each of the two structural mounting elements are independently removable. In yet other embodiments, each field shaping unit, whether removable or fixed, comprises three structural mounting elements, where each of the three structural mounting elements are independently removable. In further embodiments, each field shaping unit, whether removable or fixed, comprises four or more structural mounting elements, where each of the four structural mounting elements are independently removable.

As described herein, in some embodiments, one or more shaping coils are removably mounted to the surface 215 of any individual structural mounting element 211 (see, e.g., FIG. 2A). In some embodiments, fluid-carrying conduits and electrical leads may be removably coupled to the structural mounting elements (see, e.g., FIG. 11).

Support for Field Shaping Units

In some embodiments, the field shaping units are supported by each other. In other embodiments, field shaping units may are supported by a structural scaffolding. In yet other embodiments, any field shaping unit are supported by a combination of neighboring field shaping units and a structural scaffolding.

Figure 12:
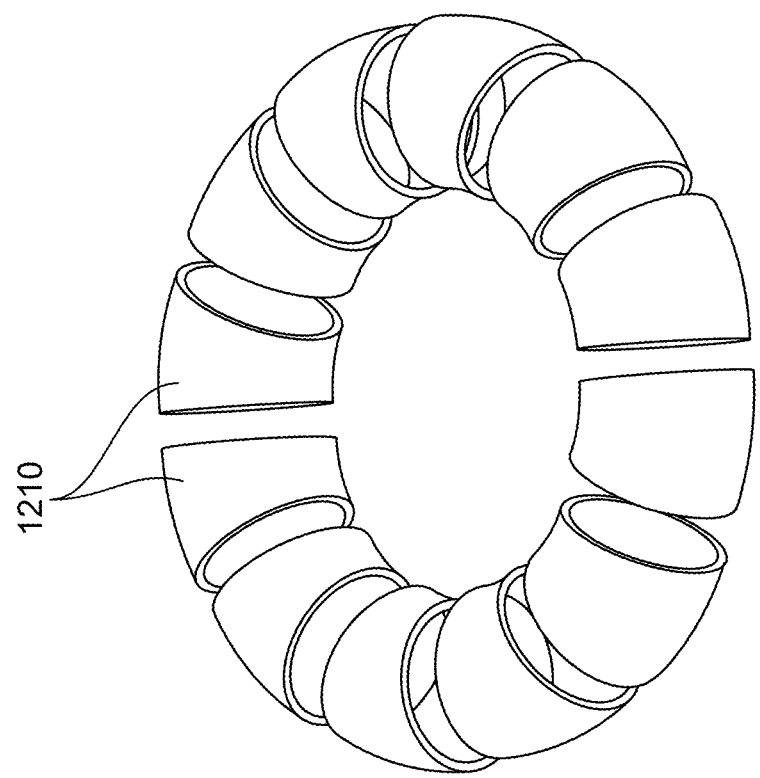
FIG. 12 illustrates a field-shaping coil system 1203 including a plurality of removable field shaping units 1210 (see FIG. 12, right) in accordance with one embodiment of the present disclosure. In this embodiment, each removable field shaping unit 1210 of the plurality of removable field shaping units are supported by a neighboring field shaping unit 1210 (FIG. 12, left). While not depicted, each removable field shaping unit 1210 of the plurality of removable field shaping units may be further supported by a scaffolding.
Figure 12:
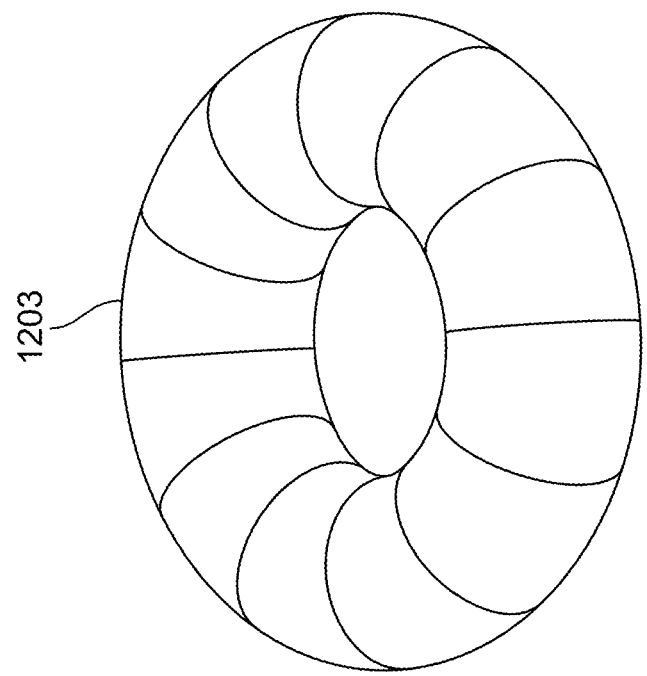

With reference to FIG. 12, in some embodiments any individual field shaping unit 1210 included within any field-shaping coil system 1203 may be structurally supported, at least in part, by one or more neighboring field shaping units. In some embodiments, the edges of the field shaping units 1210 include one or more features (see, e.g., FIG. 13) which allow neighboring field shaping units to be removably coupled to one another. Such features include, but are not limited to, flanges, structural butts, bolted joints, threated inserts, clamps, snap-fit joints, hook and loop fasteners, keyed joints, dowel pins, or any combination thereof.

Figure 13A:
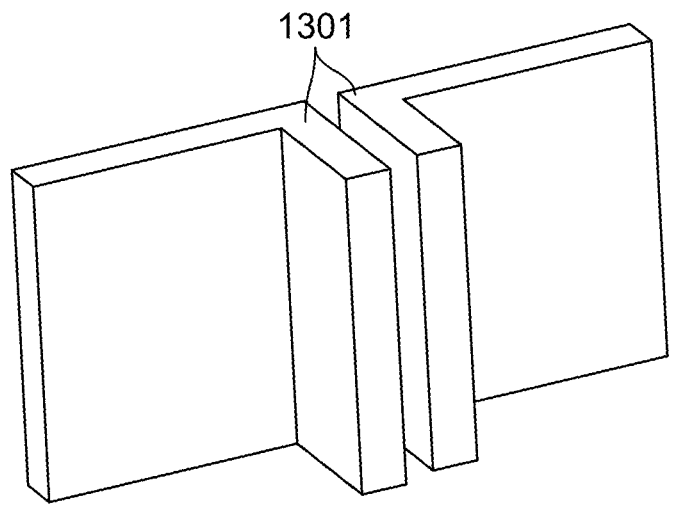
FIGS. 13A-13C depict edges of neighboring field shaping units, where such edges include one or more features which facilitate the removable coupling of the neighboring field shaping units.
Figure 13B:
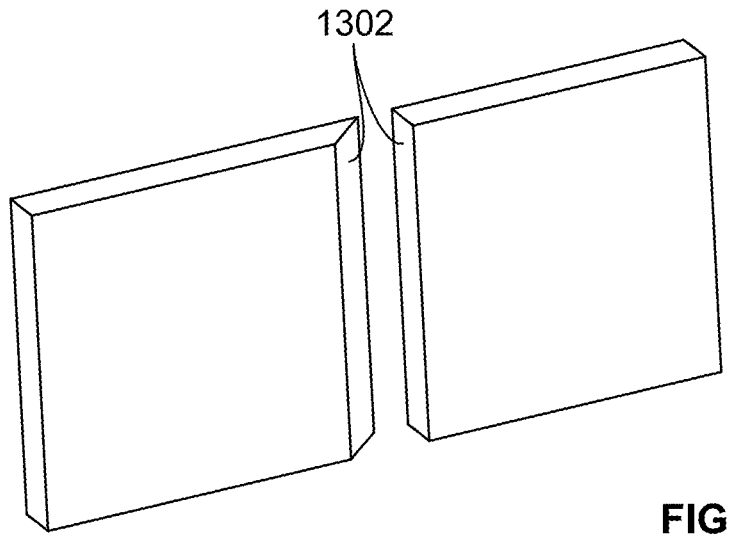
Figure 13C:
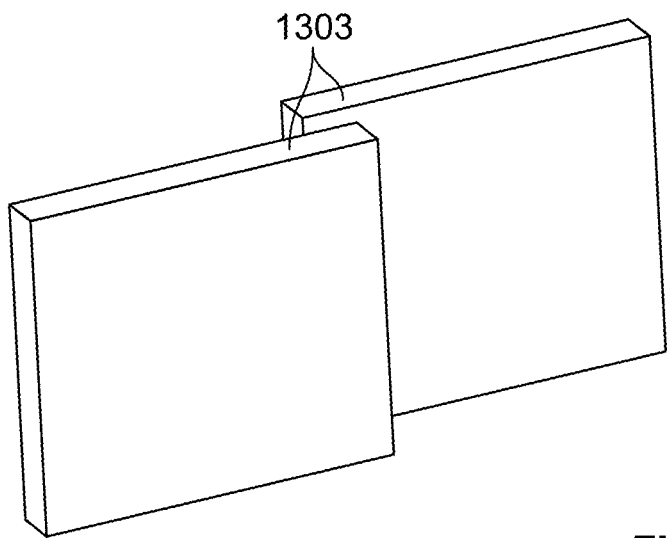

By way of example, the edges of any two neighboring field shaping units may include a flange 1301, such as for clamping or bolting (see FIG. 13, left). In some embodiments, the flange 1301 projects normally out of the plane of the field-shaping coil system. By way of another example, the edges of any two neighboring field shaping units may include one or more structural butts 1302, such as for welding or soldering (see FIG. 13, center). By way of yet another example, the edges of any two neighboring field shaping units may include overlapping sheets 1303 for bolting or pinning (see FIG. 13, right).

Examples of other non-limiting methods for removably securing one field shaping unit to another field shaping unit (such as at their edges) include:
(i) Bolted joints, consisting of a bolt that is inserted through holes in two components and secured with a removable nut;
(ii) Threaded inserts, such as a pre-tapped component inserted into another permanently which then accepts a threaded bolt thereby joining to parts;
(iii) Clamping, using application of pressure via a removable device or attachment at surfaces of components to secure them together;
(iv) Snap-fit joints or hook and loop fasteners, using a locking mechanism consisting of a protrusion and a recess or hoop that interlock when components are brought together;
(v) Keyed joints or dowel pins, components are held together by interlocking mechanism;
(vi) Adhesive bonding, using an additional adhesive such as glue or epoxy which bonds two or more components together by filling space between them or applied to mutually facing surfaces;
(vii) Welding, where the metal structure of two components are joined together at several locations that can be cut at a later time; and/or
(viii) Soldering, where a volume-filling material is deposited with an application of heat in the space between two or more components providing a bridging bond that can be cut at a later time.

Figure 14:
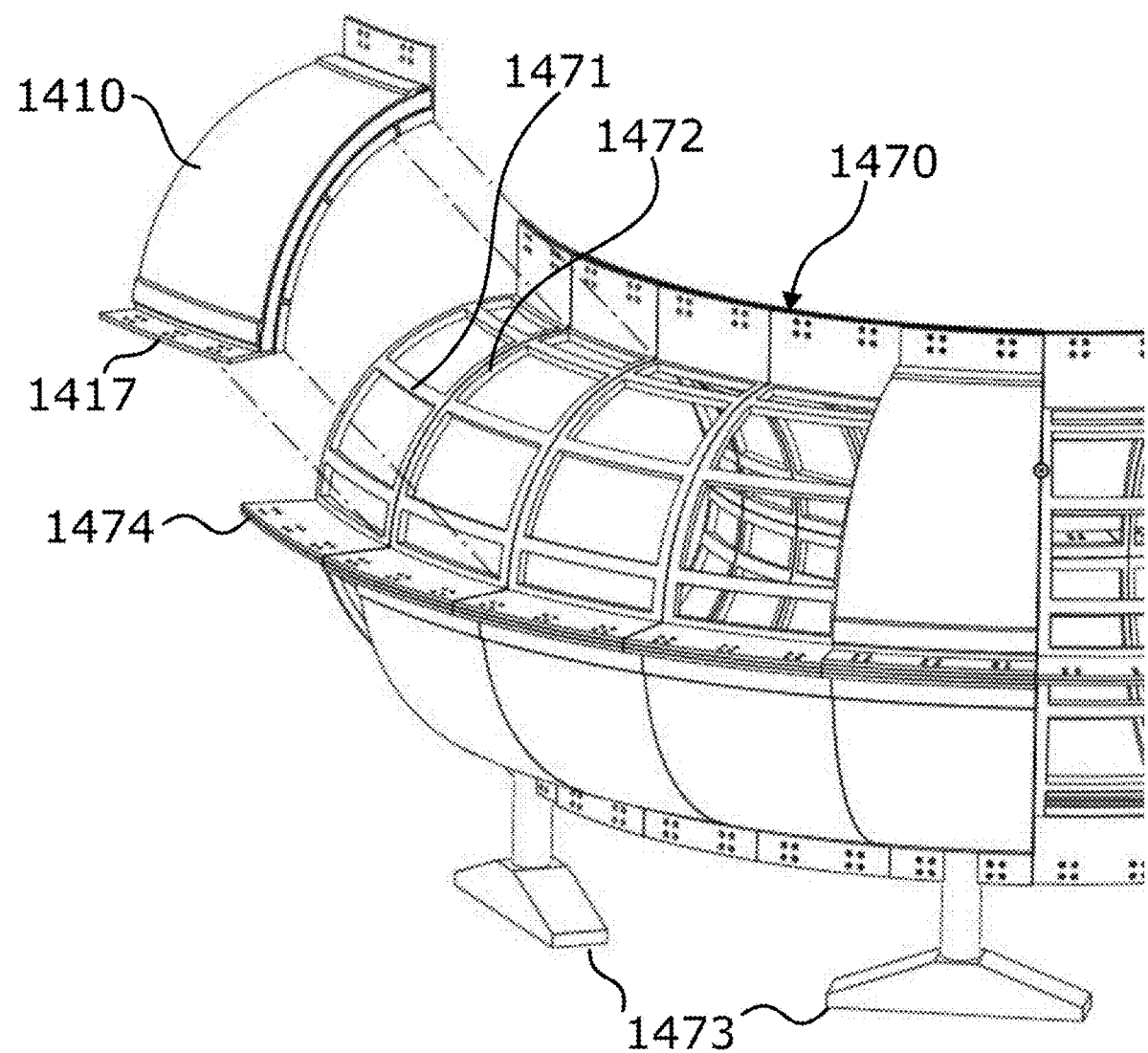
FIG. 14 illustrates a structural scaffolding 1470 to which field shaping units 1410 are removably mounted. In some embodiments, the structural scaffolding, or components thereof, support one or more field shaping units against gravity and electromagnetic forces. The figure shows a structural scaffolding including toroidal 1471 and poloidal ribs 1472; and appendages 1473, supporting a plurality of removable field shaping units. In some embodiments, this structural scaffolding includes a mounting structure 1474 to which field shaping units are fastened via bolts through flanges 1417 at the edge of the field shaping units.

In some embodiments, and with reference to FIG. 14, one or more field shaping units 1410 are removably secured to a structural scaffolding 1470 or a portion thereof. In some embodiments, the structural scaffolding 1470 is a rigid assembly which serves to structurally support the one or more field shaping units 1410 and the strong (e.g., tons, tens of kilonewtons) magnetic and other forces exerted on them. In some embodiments, the structural scaffolding 1470 includes one or more sets of ribs. In some embodiments, the structural scaffolding 1470 includes a set of poloidal ribs 1472 (e.g., 8, 12, 16, 20, 24, etc., poloidal ribs) and/or a set of toroidal ribs 1471 (e.g., 4, 5, 6, 8, 12, 16, 20, etc. toroidal ribs) configured to support the one removable or more field shaping units 1410. In some embodiments, the number of poloidal ribs is equal to the number of encircling coils. In some embodiments, a ratio of poloidal ribs to encircling coils is 1:1, 2:1, 3:1, 4:1, 5:1, etc. In some embodiments, the number of toroidal ribs is equal to the number of encircling coils. In some embodiments, a ratio of toroidal ribs to encircling coils is 1:1, 2:1, 3:1, 4:1, 5:1, etc.

In some embodiments, structural scaffolding 1470 further includes one or more mounting members 1474, e.g., one or more flanges, keyed joins, dowel pins, etc., In those embodiments where the one or more mounting members 1474 are flanges, one or more first flanges are complementary to one or more second flanges of the one or more removable field shaping units 1410 (e.g., such that the second flanges lie flush with the first flanges along a section of their length).

In some embodiments, the structural scaffolding 1470 may further include one or more appendages 1473 (e.g., 2 or more, 4 or more, 6 or more, 8 or more, 10 or more, 12 or more, etc. appendages) which assist in securing the field-shaping coil system to a surface (e.g., the ground). In some embodiments, the one or more appendages are coupled to one of a poloidal rib, a toroidal rib, a junction between a toroidal rib and a poloidal rib, etc. In some embodiments, the one or more appendages may be connected permanently, connected removably, connected via bolt holes, via clamping, via snap-fit, via welding, etc. to the ground or other surface With reference to FIG. 18, the structural scaffolding 1870 may include one or more curved or planar plates 1876 that substantially conform to the boundary of the plasma 1800. In some embodiments, field shaping units may be removably mounted to these curved or planar plates 1876 by their edges 1417 or one or more points on their surface 1719 (see FIGS. 14 and 17). In other embodiments, the structural scaffolding includes one or more mounting points which mate with corresponding mounting points on the exterior of field shaping units. In some embodiments, the one or more plates may be radially inward, toward the plasma from the field shaping units. It is believed that plates would be stiffer than poloidal and/or toroidal ribs to deformations in the in-plane shear direction (parallel to the plasma surface). It is believed that plates would permit a flatter profile to the structural scaffolding, allowing the shaping coils to lie closer to the plasma than if only ribs were used.

In some embodiments, the field shaping units and the scaffolding are removably secured to one another using any method known in the art, such as through one of the methods described below:
  (i) Bolted joints, consisting of a bolt that is inserted through holes in two components and secured with a removable nut;
  (ii) Threaded inserts, such as a pre-tapped component inserted into another permanently which then accepts a threaded bolt thereby joining to parts;
  (iii) Clamping, using application of pressure via a removable device or attachment at surfaces of components to secure them together;
  (iv) Snap-fit joints or hook and loop fasteners, using a locking mechanism consisting of a protrusion and a recess or hoop that interlock when components are brought together;
  (v) Keyed joints or dowel pins, components are held together by interlocking mechanism;
  (vi) Adhesive bonding, using an additional adhesive such as glue or epoxy which bonds two or more components together by filling space between them or applied to mutually facing surfaces;
  (vii) Welding, where the metal structure of two components are joined together at several locations that can also be cut at a later time; and/or
  (viii) Soldering, where a volume-filling material is deposited with an application of heat in the space between two or more components providing a bridging bond.

In some embodiments, the scaffolding may support a field shaping unit by its edge (see, e.g., FIG. 14) or by some point along its normal-facing surface (along its surfaces which lie parallel to the plane of the coil; see, e.g., FIG. 17). In some embodiments, if the scaffolding supports a field shaping unit by its edge, the edges of a field shaping units and scaffolding may have a flange (1417 and 1474 respectively) which projects normally out of the plane of the field-shaping coil system, for clamping or bolting (see, e.g., FIG. 14). In some embodiments, the edges of the field shaping units may have structural butts for welding or soldering. In some embodiments, the edges of the field shaping units may have overlapping sheets for bolting or pinning.

Figure 17A:
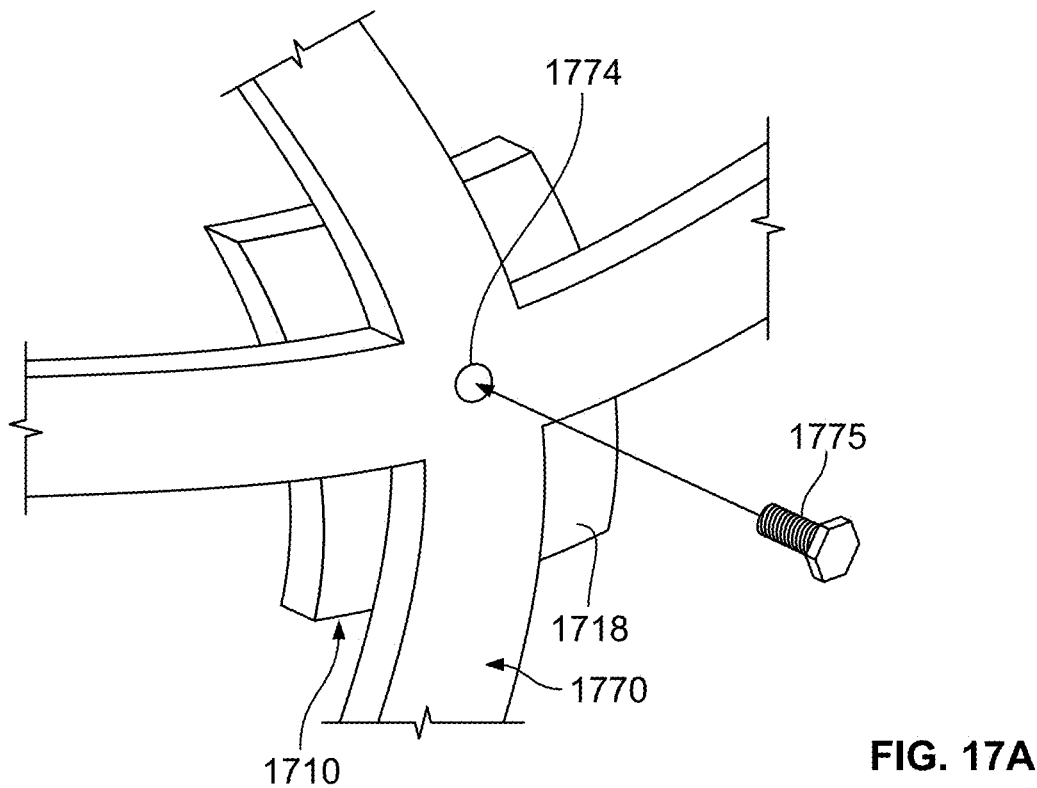
FIGS. 17A and 17B illustrate portions of an assembly for a stellarator in which a field shaping unit 1710 is attached to a structural scaffolding 1770 along the field shaping unit's normal facing surface 1718.
Figure 17B:
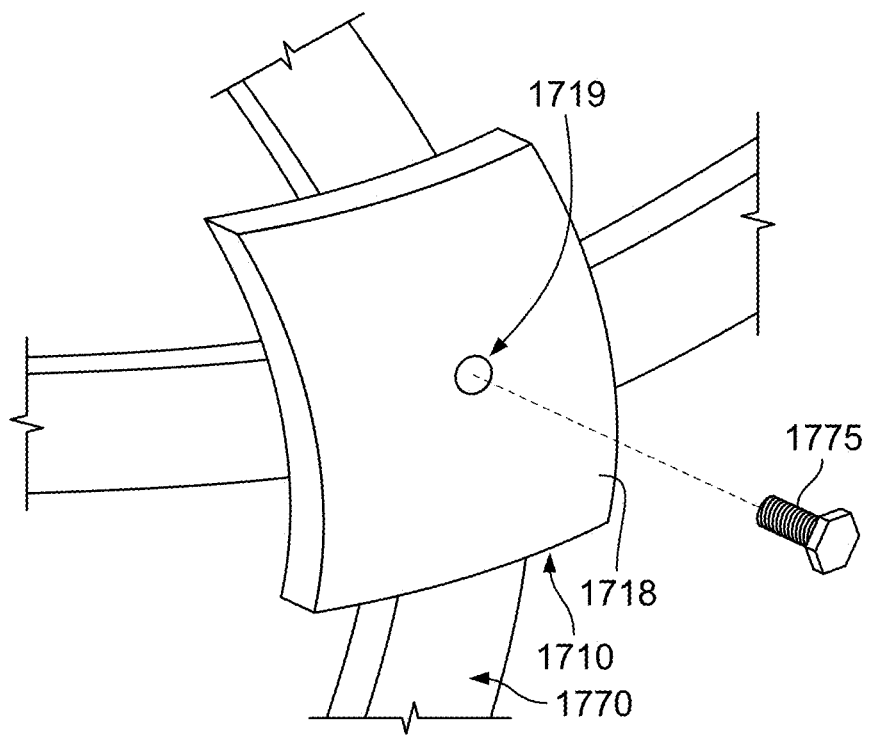

In some embodiments, if the scaffolding supports a field shaping unit by some point along its normal-facing surface (i.e., along its surfaces which lie parallel to the plane of the coil) 1718, the field shaping unit 1710 may have one or more bolt holes 1719 to receive bolts 1775, and the structural scaffolding 1770 may have a corresponding bolt hole 1774 (see FIGS. 17A and 17B). In some embodiments, the field shaping unit may have a structural mounting point on its normally outward or inward surface which can be removably bonded to the corresponding mounting point on the structural scaffolding by one of the above methods.

Shaping Coils

As noted herein, the one or more field shaping units include a plurality of field shaping coils. It is believed that the one or more shaping coils of the present disclosure are relatively easy to manufacture, assemble, and integrate into a removable field shaping unit. Moreover, it is believed that the one or more shaping coils allow precise control over the shape of the plasma.

In some embodiments, and with reference to FIG. 2A, the plurality of shaping coils 212 are removably coupled on the surface 215 of each of the one or more structural mounting elements 211.

Figure 11:
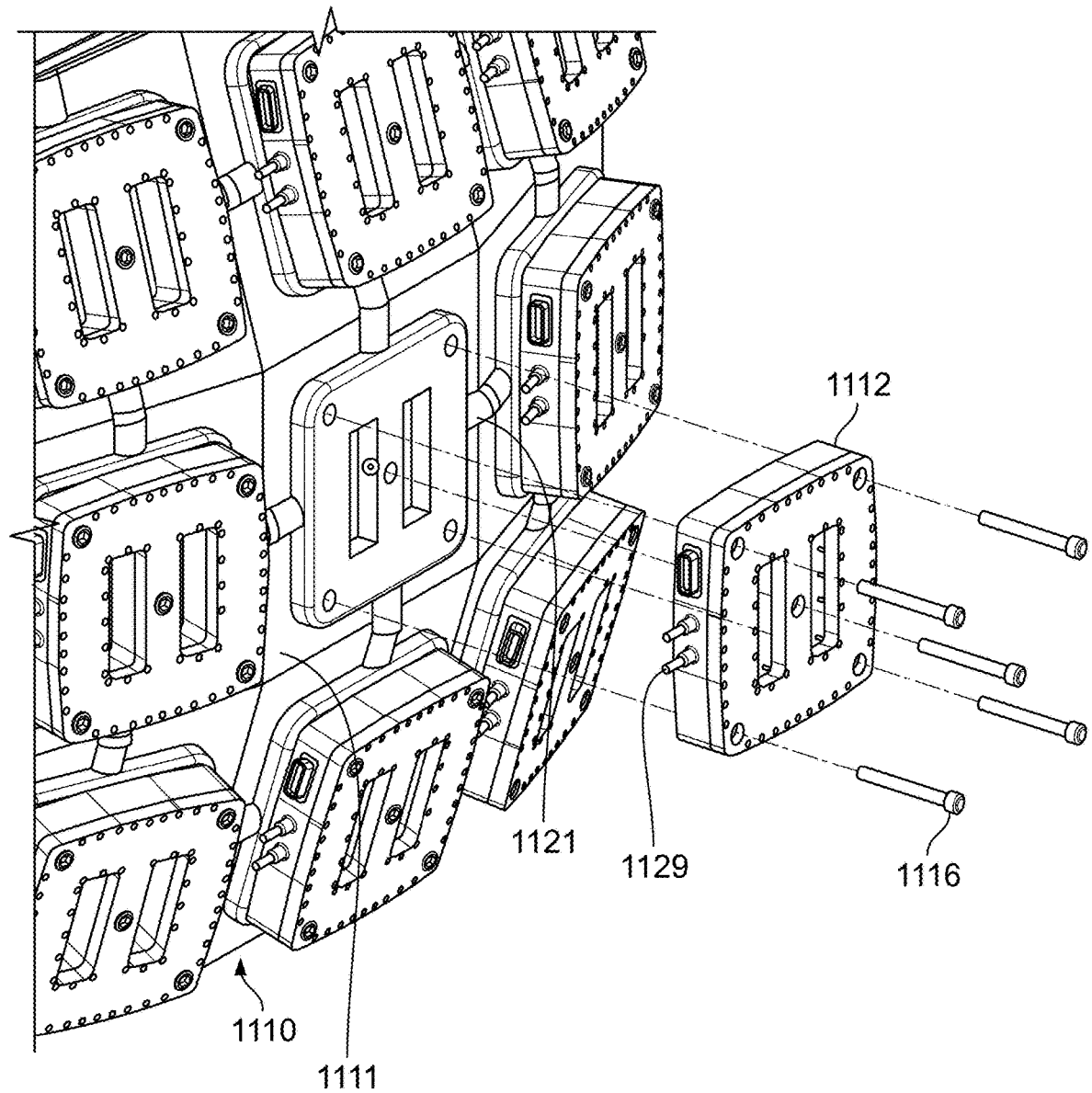
FIG. 11 depicts that shaping coils may be removably attached to a field shaping unit 1110 or a component thereof. For instance, planar shaping coils 1112 may be removably mounted to a structural mounting element 1111 by removable fasteners 1116.

In some embodiments, each shaping coil of the plurality of shaping coils are removably attached to a surface of one or more structural mounting elements 1111 of a field shaping unit 1110. With reference to FIG. 11, in some embodiments, the one or more shaping coils 1112 are removably attached to a structural mounting element 1111 using one or more fasteners 1116, such as one or more bolted joints, including a bolt that is inserted through holes in two components (e.g., shaping coils and the structural mounting element) and secured within a removable nut. In other embodiments, the one or more shaping coils are removably attached to one or more structural mounting elements using one or more threaded inserts (such as a pre-tapped component inserted into the structural mounting element which then accepts a threaded bolt). In yet other embodiments, the one or more shaping coils are removably attached to one or more structural mounting elements via clamping (such as through the application of pressure via a removable device or attachment at the surfaces of two or more components, such as the coil and the structural mounting element). In even further embodiments, the one or more shaping coils are removably attached to the one or more structural mounting elements with snap-fit joints or hook and loop fasteners (such as using a mechanism including a protrusion and a recess or hoop that interlocks when components are brought together). In yet even further embodiments, the one or more shaping coils are removably attached to the one or more structural mounting elements using keyed joints or dowel pins (where the components are held together by an interlocking mechanism). In yet further embodiments, the one or more shaping coils are removably attached to the one or more structural mounting elements through a magnetic attachment (where magnetic forces generated by an additional attaching magnet or the field-shaping coil system release when de-energized).

Figure 4:
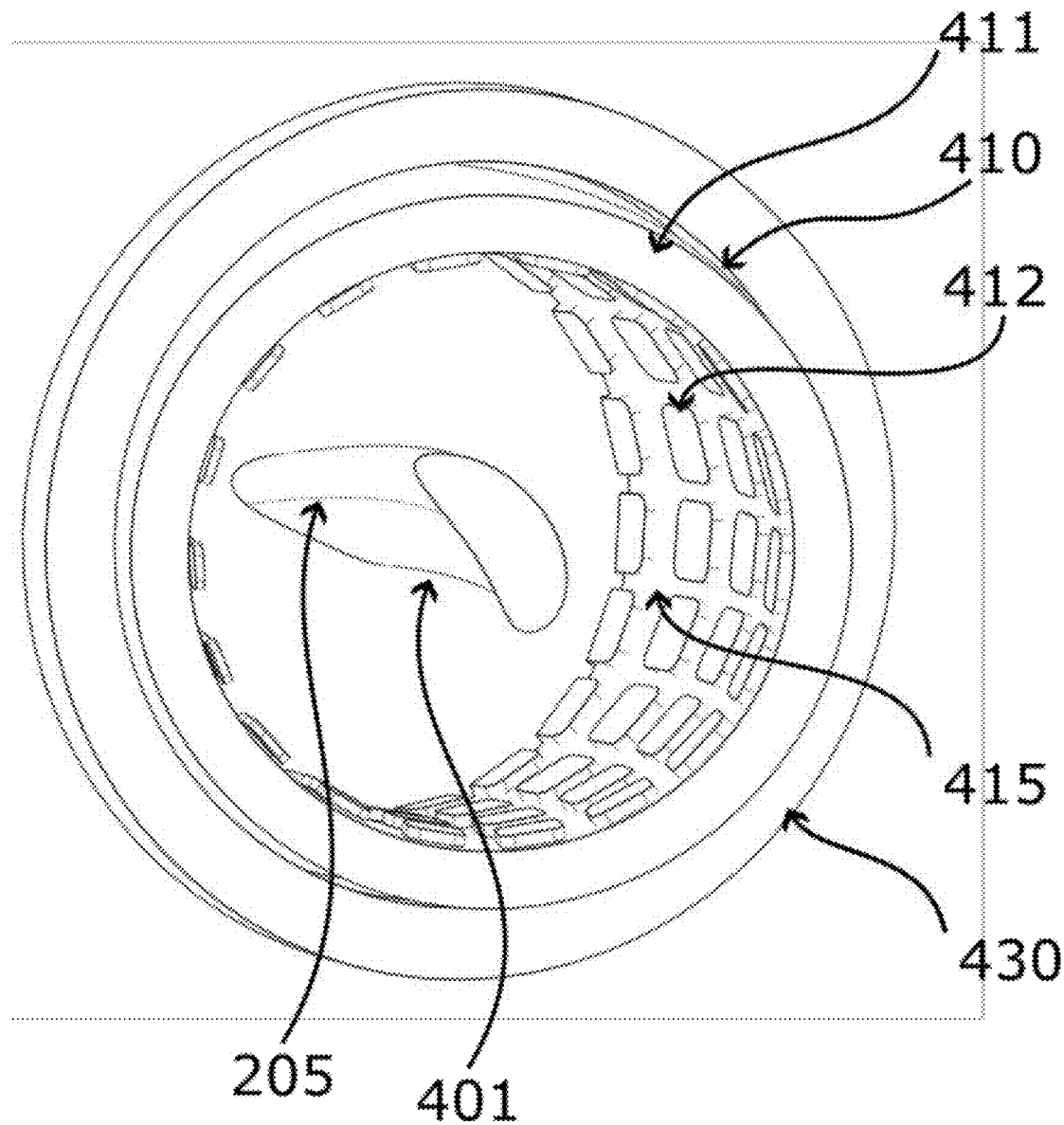
FIG. 4 illustrates a cross sectional view of a stellarator showing a field shaping unit 410 and an encircling coil 430 in accordance with one embodiment of the present disclosure. One or more shaping coils 412 are removably mounted on an interior surface 415 of a structural mounting element 411. The plasma 401 having a plasma axis 205 is illustrated as contained within the removable field shaping unit 410 (or a void defined by one or more field shaping units).

In some embodiments, each shaping coil of the plurality of shaping coils are planar coils. A "planar" coil is one whose shape substantially lies within one flat plane. In some embodiments, and with reference to at least FIGS. 2A, 4A, and 5, each of the shaping coils 212 individually do not encircle the plasma axis 205. Said another way, any one shaping coil 212 does not encircle the plasma 200 or the plasma axis 205. For instance, and as depicted in FIGS. 4 and 5, the shaping coils 412 or 512 are disposed on surface 415 or 515 of a structural mounting element 411 or 511, respectively, and each individual shaping coil 412 or 512 does not encircle the plasma axis.

While any individual shaping coil 212 (regardless of whether it is removable or not) does not encircle the plasma axis 205, collectively an array including a plurality of shaping coils 212 mounted on the surfaces 215 of one or more structural mounting elements 211 would encircle the plasma axis 205. This is illustrated in FIG. 4A which shows a plurality of shaping coils 412 arranged on a surface 415 of a structural mounting element 411. As depicted, no one shaping coil 412 encircles the plasma confined in the void 401. However, the collective of all shaping coils 412 as arranged on the surface 415 of the one or more structural mounting elements 411 does encircle the plasma and/or the void 401. This concept is further illustrated in FIG. 5, which again illustrates that no one shaping coil 512 encircles the plasma confining void 501. In some embodiments, individual shaping coils 512 may be positioned on opposite sides of the plasma or on different faces of the void.

Figure 5:
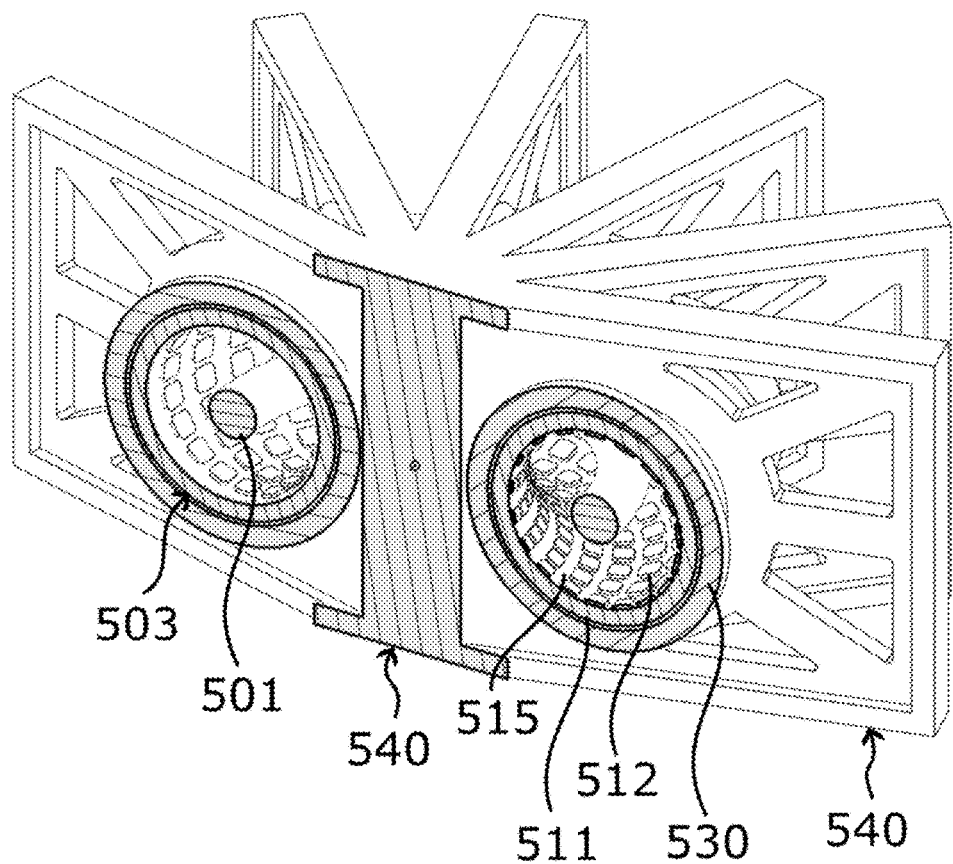
FIG. 5 shows a cross sectional view of a portion of a stellarator and depicts one or more encircling coils 530 encircling a field-shaping coil system 503 defining a void 501 adapted to confine a plasma in accordance with one embodiment of the present disclosure.

Additionally, each shaping coil of the plurality of shaping coils 212, 412 or 512 do not interlock with any other shaping coil, such as illustrated in at least FIGS. 2A, 4A and 5. Additionally, each of the one or more shaping coils do not interlock with any of the encircling coils 230 described herein (see FIGS. 2A, 4A, and 5). In some embodiments, the one or more shaping coils 212 are removably coupled to the surface 215 of the one or more structural mounting elements 211.

In some embodiments, the planar shaping coils have a mean coil radius 208 (see FIG. 2C) which is smaller than a major radius of the plasma 207 and smaller than a minor radius of the plasma 206. As used herein, the "major radius" of the plasma is the mean distance between the plasma axis and the geometric center of the stellarator. As used herein, the "minor radius" of the plasma is the mean closest distance between each point on the plasma boundary and the plasma axis. The plasma boundary is sometimes represented by a set of toroidal Fourier amplitudes; for this case, the major radius is represented by the amplitude of the mode with toroidal mode number 0 and poloidal mode number 0; and the minor radius is represented by the amplitudes of the mode with toroidal mode number 0 and poloidal mode number 1.

Figure 3A:
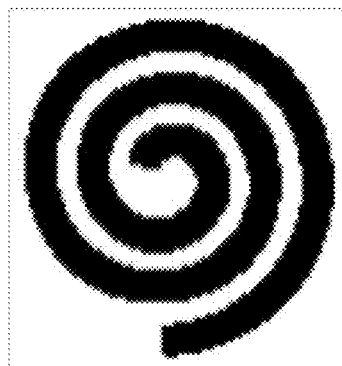
FIG. 3A illustrates a coil design having a circular winding pattern.
Figure 3B:
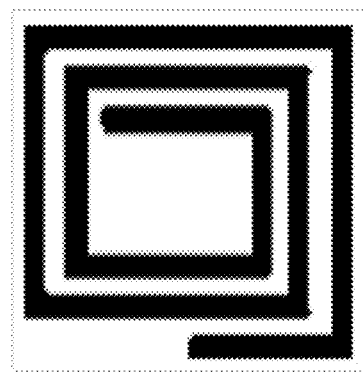
FIG. 3B illustrates a coil design having a rectangular winding pattern.
Figure 3C:
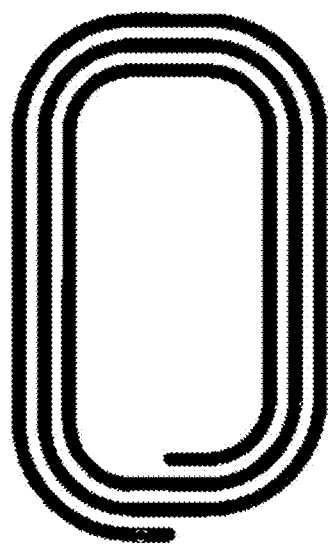
FIG. 3C illustrates a coil design having a rectangular winding pattern, but where
the edges are rounded.

The shaping coils 212 may have different sizes and shapes. For instance, and with reference to FIG. 3A, in some embodiments the shaping coils 212 may be circular or substantially circular. In other embodiments, the shaping coils may be rectangular or substantially rectangular (FIG. 3B). In yet other embodiments, the shaping coils may be rectangular with rounded corners or substantially rectangular with rounded corners (FIG. 3C). In some embodiments, each removable field shaping unit 210 may comprise one or more coils having different shapes. For instance, a removable field shaping unit 210 may comprise 10 shaping coils where 3 of the shaping coils may have a substantially circular shape, 4 of the shaping coils may have a substantially rectangular shape, and 3 of the coils may have a substantially rectangular shape with rounded corners (not depicted).

In some embodiments, the stellarator of the present disclosure may include between about 10 and 10,000 shaping coils. In other embodiments, the stellarator of the present disclosure may include between about 50 and 5,000 shaping coils. In yet other embodiments, the stellarator of the present disclosure may include between about 100 and 5,000 about shaping coils. In further embodiments, the stellarator of the present disclosure may include between about 100 and 4,000 about shaping coils. In yet further embodiments, the stellarator of the present disclosure may include between about 100 and 3,000 about shaping coils. In even further embodiments, the stellarator of the present disclosure may include between about 100 and 2,000 about shaping coils. In even further embodiments, the stellarator of the present disclosure may include between about 100 and 1,000 about shaping coils.

In some embodiments, a removable field shaping unit 210 may include between about 5 and about 250 shaping coils 212. In some embodiments, a removable field shaping unit 210 may include between about 5 and about 200 shaping coils 212. In some embodiments, a removable field shaping unit 210 may include between about 5 and about 150 shaping coils 212. In other embodiments, a removable field shaping unit 210 may include between about 5 and about 100 shaping coils 212. In yet other embodiments, a removable field shaping unit 210 may include between about 5 and about 80 shaping coils 212. In further embodiments, a removable field shaping unit 210 may include between about 5 and about 70 shaping coils 212. In even further embodiments, a removable field shaping unit 210 may include between about 5 and about 60 shaping coils 212. In yet even further embodiments, a removable field shaping unit 210 may include between about 5 and about 50 shaping coils 212. In yet even further embodiments, a removable field shaping unit 210 may include between about 5 and about 45 shaping coils 212. In yet even further embodiments, a removable field shaping unit 210 may include between about 5 and about 40 shaping coils 212. In yet even further embodiments, a removable field shaping unit 210 may include between about 5 and about 35 shaping coils 212. In yet even further embodiments, a removable field shaping unit 210 may include between about 5 and about 30 shaping coils 212. In yet even further embodiments, a removable field shaping unit 210 may include between about 5 and about 25 shaping coils 212.

Figure 22A:
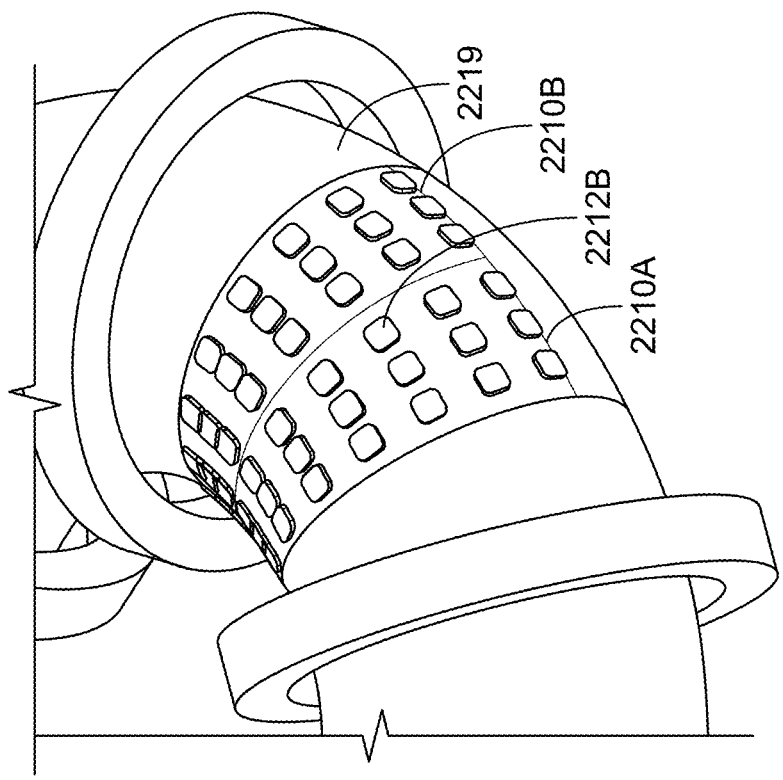
FIGS. 22A and 22B show configurations of components of a stellarator which fail (FIG. 22A) and satisfy (FIG. 22B), respectively, the criterion that no individual shaping coil should span an area outside the perimeter of any one field shaping unit 2210A or 2210B. Specifically.
Figure 22B:
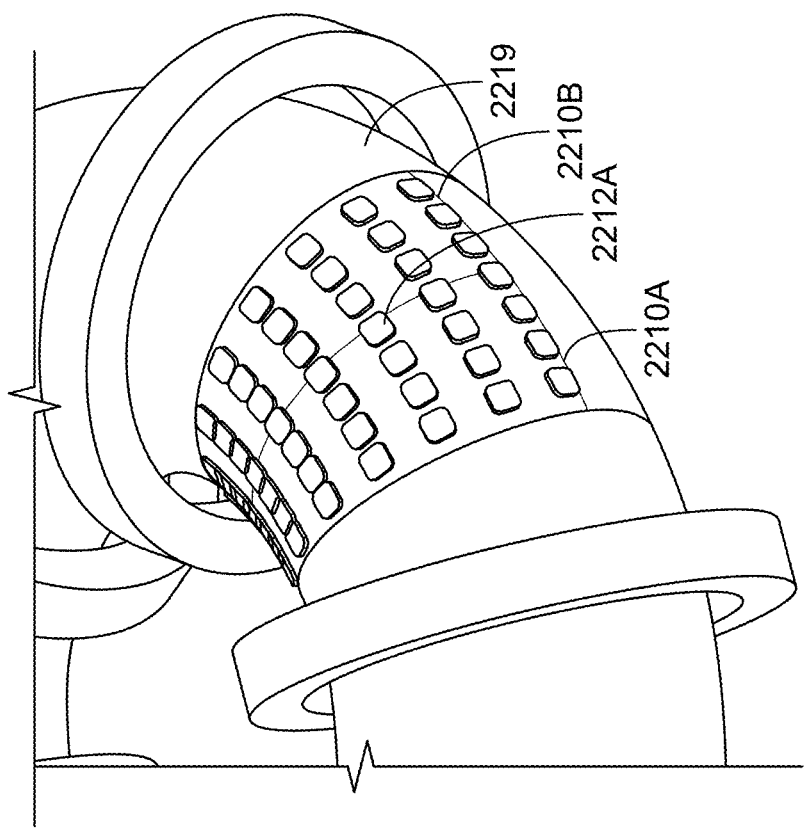

With reference to FIG. 22B, in some embodiments, each of the removable shaping coils 2212B of any field shaping unit are completely within the perimeter of one field shaping unit 2210A or 2210B to facilitate removability. With reference to FIG. 22A, no planar shaping coils 2212A should span more than one field shaping unit 2210A or, 2210B (where the shaping coil 2212A is depicted as "straddling" areas in both field shaping units 2210A and 2210B). Additionally, FIGS. 22A and 22B show an external casing 2219 which has been partially removed to expose the shaping coils 2212A, 2212B.

Fluid and Electrical Connections

In some embodiments, the field shaping units include one or more fluid-carrying carrying conduits and/or one or more electrical leads. In some embodiments, these fluid-carrying carrying conduits and/or electrical leads are configured to faciliate removal of the field shaping units from the field-shaping coil system, without having to reconfigure any of the encircling coils.

Figure 15:
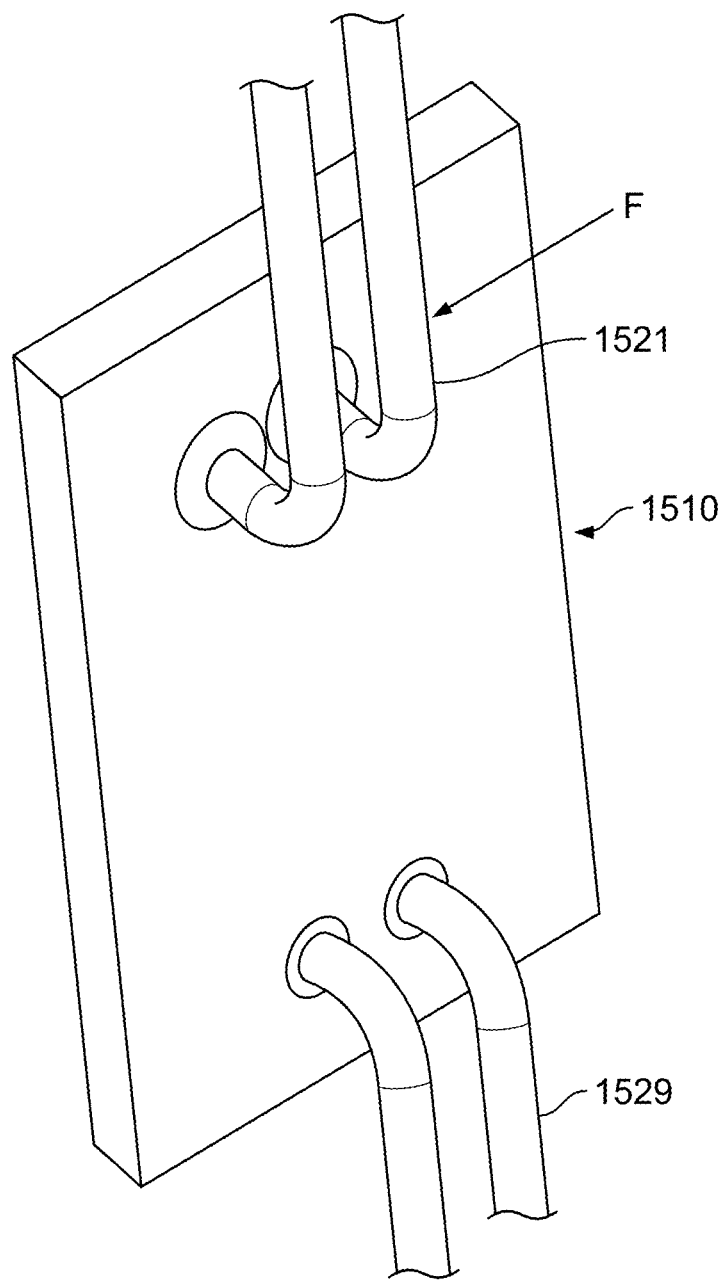
FIG. 15 illustrates a field shaping unit 1510 with electrical leads 1529 and/or fluid carrying conduits 1521, including those which may be disconnectable.

With reference to FIG. 15, in some embodiments, the one or more fluid-carrying conduits 1521 fluidically couple one or more fluid sources to one or more components within the one or more field shaping units 1510, such as to the one or more shaping coils removably coupled thereto. Likewise, the fluid-carrying conduits 1521 fluidically couple one or more components within the one or more field shaping units to one or more drains such that fluid may be removed from the one or more components within the one or more field shaping units. Non-limiting examples of fluids that may be carried including cryogenic gaseous or supercritical or liquid helium, liquid neon, and water. For instance, fluid-carrying conduits 1521 may carry cryogens to cool one or more shaping coils.

In some embodiments, the fluid-carrying conduits 1521 are fed by and drain into one or more neighboring field shaping units (see also 1121 of FIG. 11). In other embodiments, the fluid-carrying conduits 1521 are fed by and drain into one or more manifolds which feed and drain multiple field shaping units. Within any individual field shaping unit, these fluid-carrying conduits 1521 may be continuous and unbroken, or they may have removable connections (see, e.g., FIG. 15) to individual shaping coils within the that field shaping unit. In some embodiments, the fluid-carrying conduits that feed and drain the one or more neighboring field shaping units include one or more removable couplings to facilitate the removability of at least one of the neighboring field shaping units.

In some embodiments, the removable connections for fluid-carrying conduits 1521 between adjacent field shaping units, external manifolds, and shaping coils may employ one or more components for creating and/or maintaining fluid-tight seals between fluid-carrying conduits, such as threaded joints, compression fittings, flare fittings, union fittings, tri-clamp fittings, quick connect fittings, and cam-and-groove couplings.

In some embodiments, one or more more electrical leads 1529 communicatively couple one or more electrical sources to one or more components within the one or more field shaping units, such as to the one or more shaping coils removably coupled thereto (see FIG. 11, which illustrates that a shaping coil 1112 may be removably communicatively coupled to one or more shaping coils through one or more electrical leads 1129). By way of another example, electrical leads 1529 may carry electrical current to the one or more shaping coils to allow it to generate a magnetic field. By way of another example, electrical leads 1529 may carry electrical signal, analog or digital, from diagnostic units (e.g., temperature sensors, vibration sensors, voltage sensors, magnetic field sensors, and strain gauges) disposed within the one or more field shaping units.

In some embodiments, the field shaping units include one or more electrical connections. In some embodiments, electrical connections are made between the electrical leads in any field shaping unit and power supplies. In some embodiments, and to further faciliate the removal of any field shaping unit, the electrical connections include one or more disconnectable couplings. In some embodiments, the disconnectable couplings include VIPER joints, such as described in Hartwig, et al. 2020. Superconductor Science and Technology 33 (11): 11LT01. https://doi.org/10.1088/1361-6668/abb8c0. In some embodiments, electrical leads may be removably connected by clamping, adhesive bonding, welded joints, brazed joints, screw terminals, spade terminals, quick-disconnect connectors, crimp terminals, plug-and-socket, ring terminals, blade terminals, and/or pin-and-socket connectors.

In some embodiments, the field shaping units further include one or more feedthroughs for routing of vacuum lines, such as vacuum lines which interface with a vacuum cryostat included within the stellarator.

Encircling Coils

With reference to FIG. 2, the stellarator of the present disclosure also includes a plurality of encircling coils 230 which encircle/surround the plasma axis 205. In some embodiments, the plurality of encircling coils 230 interlock the plasma axis 205. Each of the encircling coils 230 are arranged around an exterior of the field shaping coil system 203 and encircle it. This is further illustrated in FIGS. 4 and 5 which show encircling coils 430 and 530 encircling the plasma and/or void 401 or 501, respectively; but where the encircling coils 430 and 530 are exterior to any removable field shaping unit 410 or 510.

In some embodiments, each encircling coil 230 of the plurality of encircling coils are planar. Moreover, each encircling coil 230 of the plurality of encircling coils are non-interlocking with any other encircling coil 230. Additionally, each encircling coil 230 of the plurality of encircling coils are do not interlock with any of the shaping coils 212. Said another way, any encircling coil 230 does not interlock with any other encircling coil 230 or with any other shaping coil 212, such as depicted in FIGS. 2A, 2B, and 5. In some embodiments, the plurality of encircling coils interlock the plasma. In some embodiments, the plurality of encircling coils interlock the plasma, but any individual encircling coil does not interlock any other encircling coil. In some embodiments, each encircling coil 230 is supported by a structural support 231. In some embodiments, the structural support 231 and the removable field shaping units 210 may be coupled to other structural members 540 which react to unbalanced forces and torques.

In some embodiments, the stellarators of the present disclosure include between about 3 and about 150 encircling coils. In other embodiments, the stellarators of the present disclosure include between about 3 and about 100 encircling coils. In yet other embodiments, the stellarators of the present disclosure include between about 3 and about 75 encircling coils. In further embodiments, the stellarators of the present disclosure include between about 3 and about 50 encircling coils. In yet further embodiments, the stellarators of the present disclosure include between about 3 and about 25 encircling coils. In even further embodiments, the stellarators of the present disclosure include between about 3 and about 15 encircling coils. In yet even further embodiments, the stellarators of the present disclosure include between about 3 and about 10 encircling coils. In some embodiments, the spacing between each encircling coil may range from between about 10 cm to about 1 m.

Materials for the Shaping Coils and Encircling Coils

The shaping coils 212 and the encircling coils 230 may be comprised of one or more 'conducting materials. A superconductor is a material that achieves superconductivity. Superconductivity is the property of certain materials to conduct direct current (DC) electricity without energy loss when they are cooled below a critical temperature (referred to as Tc). An electric current in a superconductor can persist indefinitely. Exemplary superconducting materials include, but are not limited to, Nb—Ti, $Nb_3Sn$, $MgB_2$, $LaBaCuO_x$, LSCO (e.g., $La_{2-x}Sr_xCuO_4$, etc.), YBCO (e.g., $YBa_2Cu_3O_x$ or $YBa_2Cu_3O_7$), REBCO, bismuth-based cuprate superconductors (BSCCO) (including $Bi_2Sr_2CaCu_2O_8$ (Bi-2212) and $Bi_2Sr_2Ca_2Cu_3O_{10}$ (Bi-2223)), TBCCO (e.g., $Tl_2Ba_2Ca_2Cu_3O_{10}$ or $Tl_mBa_2Ca_{n-1}Cu_nO_{2n+m+2+\delta}$), $HgBa_2Ca_2Cu_3O_x$, and other mixed-valence copper-oxide perovskite materials. In some embodiments, the shaping coils and the encircling coils may be included on the same materials. In other embodiments, the shaping coils and the encircling coils may be included on different materials.

Additional Coils

Figure 2D:
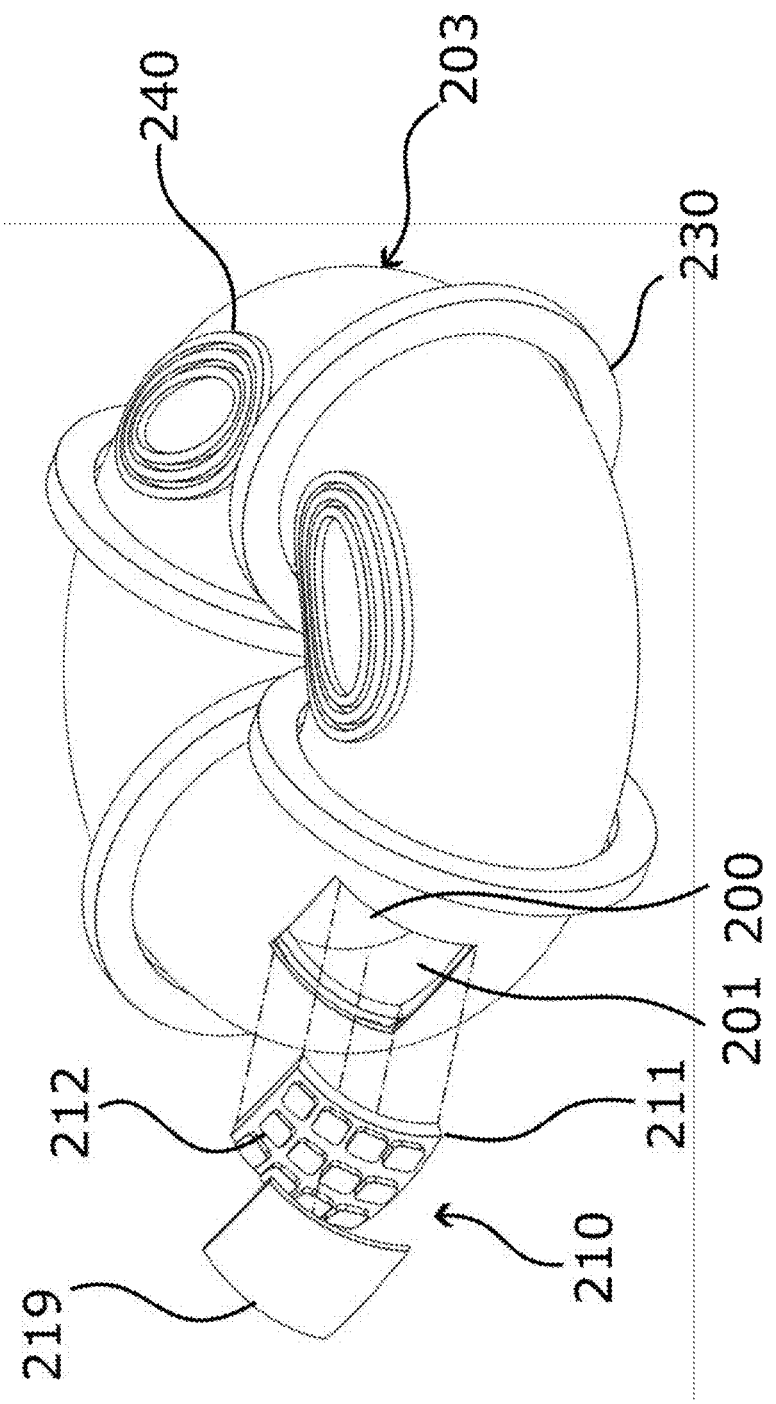
FIG. 2D illustrates a top-down view of a stellarator according in accordance with some embodiments of the present disclosure, where the stellarator is depicted as including one or more optional additional coils 240 (e.g., saddle coils). Additionally.
Figure 2E:
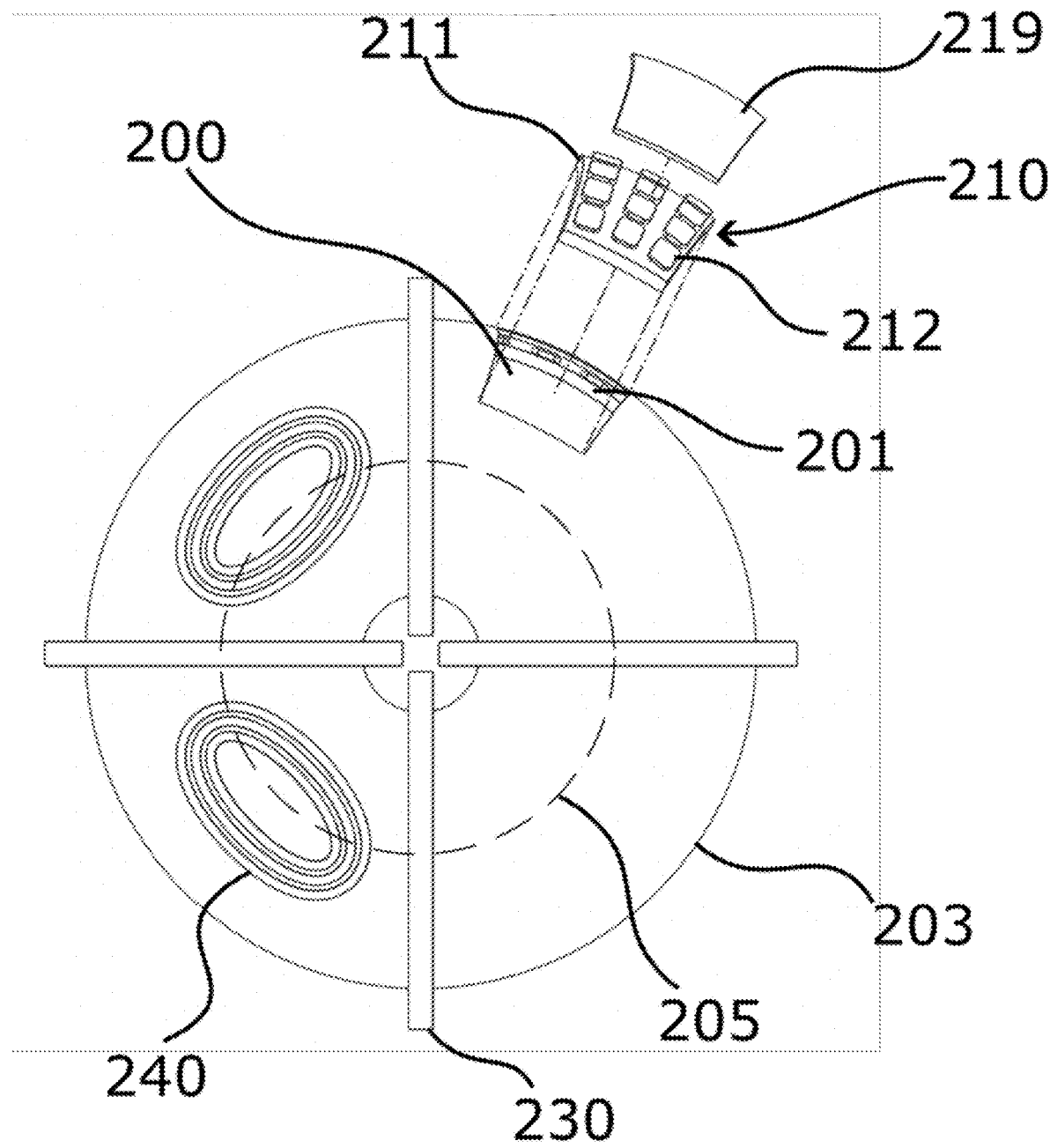
FIG. 2E illustrates a cross sectional view of a stellarator according in accordance with some embodiments of the present disclosure, where the stellarator is depicted as including one or more optional additional coils 240 (e.g., saddle coils). Additionally.

With reference to FIGS. 2D and 2E, in some embodiments, the stellarators of the present disclosure further include one or more additional coils 240, such as one or more control coils and/or one or more saddle coils. In some embodiments, the control coils and/or the saddles are planar. In some embodiments, the control coils and/or the saddles are non-planar. In some embodiments, the control coils and/or the saddles are superconducting. In some embodiments, the control coils and/or the saddles are non-interlocking and, in particular, they do not interlock any other of the disclosed coils (e.g., encircling coils, shaping coils) or the plasma axis. In some embodiments, the control coils and/or the saddle coils are disposed between the plasma boundary and the field-shaping coil system. In some embodiments, the control coils and/or the saddle coils are disposed outward of the field-shaping coil system, on the non-plasma-axis-facing side. Control coils are coils included as a contingency against unexpected sources of error. These errors may arise from errors in assembly of the magnet system, or from unexpected plasma physics. Before the error is measured, the correct electrical current for the control coils is not known. During normal operation of the stellarator, if the stellarator and plasma are operating at their design points, the control currents have zero electric current. The design of the stellarator magnetic field does not include contributions from the control coils.

Additional Interior Components

Figure 16:
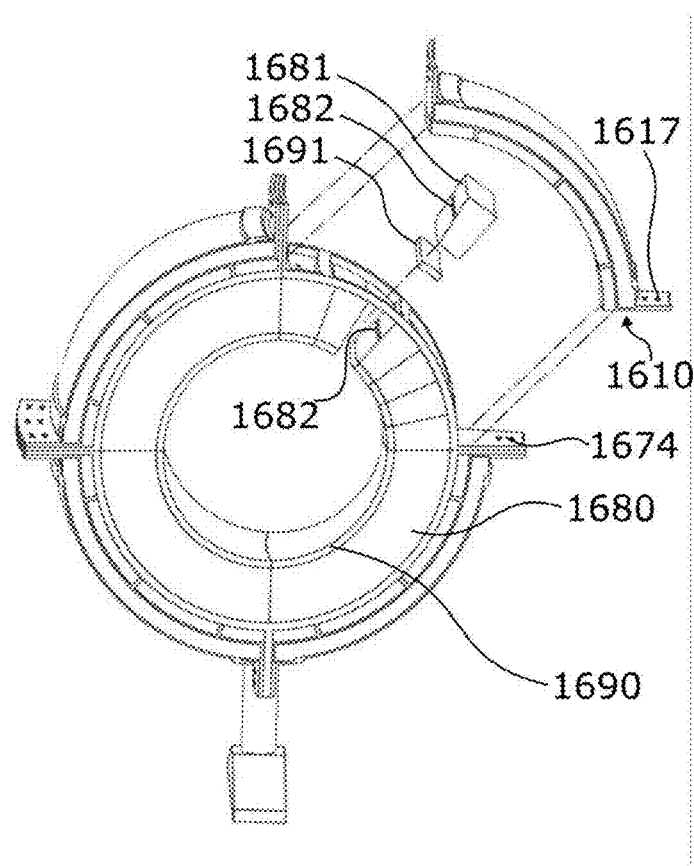
FIG. 16 illustrates a portion of an assembly for a stellarator, the assembly including a blanket system 1680 and a first wall system 1690. In some embodiments, the blanket system includes a plurality of individual sections (blanket units) 1681 which are removable from the blanket system 1680. In some embodiments, the first wall system 1690 includes a plurality of individual panels (first wall units) 1691 which are removable from the first wall system 1690.

In some embodiments, the stellarator or an assembly including a stellarator further includes one or more optional additional interior components 216, such as one or more interior systems. The one or more additional interior components include a neutron breeding blanket 1680, a first wall to handle plasma flux 1690, a system which mounts to the first wall, a cryostat, and/or neutron shielding. Interior systems In some embodiments, the optional additional interior components of the stellarator include blankets 1680 (e.g., breeding blankets to breed radioisotopes from the fusion neutron flux), plasma-facing components and first wall systems 1690, diagnostic ports, vacuum pumping ports, maintenance windows or other such functional bridgements that traverse the region encompassed by the field-shaping coil system. Field shaping units, including any of those described herein, may provide accommodation for these systems via ports, baffles, windows, reflectors, elements of a diverter system, or other mechanisms allowing for the traversal of diagnostic information or matter such as pumped gas or fluid. In some embodiments, any of the additional components including interior systems may be accessed by removing one or more field shaping units without reconfiguring any of the encircling coils. For example, FIG. 16 illustrates the removal of a single field shaping unit 1610 to expose one or more blanket units 1681 which are removable from a blanket system 1680 without reconfiguring the encircling coils. The blanket units 1681 may contain cooling channels 1682. The field shaping unit 1610 shown in FIG. 16 has a flange 1617 for removable attachment to a corresponding flange on a structural scaffolding 1674.

In some embodiments, the interior components (or portions thereof) are removable. In some embodiments, the one or more interior systems are divided into units which may be removed, maintained, and/or replaced without reconfiguring the encircling coils. This removal may occur after or at the same time that removal of a field shaping unit occurs. In some embodiments, the interior system removable units have the same shape constraints (described herein) as the field shaping units. For instance, the one or more interior systems may approximate the shape of a toroidal sector. If the interior system removable units are removed at the same time as the field shaping units, they may be mounted on the field shaping units through a removable coupling (including any of the coupling methods described herein). For instance, one or more blanket units may be mounted by complementary flanges to the inner surface of a field shaping unit so that, when a field shaping unit is removed, the one or more blanket units are also removed for maintenance or replacement. It is believed that this permits the one or more interior systems to be accessible for maintenance with a minimum of steps, ultimately aiding in the availability and economy of the fusion system.

In some embodiments, the field shaping units may also make allowances for the passage of components which receive and transport heat flux from fusion reactions produced inside the plasma. In some embodiments, field shaping units may be designed such that these heat handling components and field shaping units can be operated or maintained and accessed independently of each other, for example by constructing a fluid-carrying blanket piping such that it structurally secures to the same structural scaffolding as the field shaping units such that either can be removed independently of the other.

Controllers

In some embodiments, the stellarator is communicatively coupled to one or more controllers. In some embodiments, the one or more controllers are configured to control each of the one or more field-shaping units and optionally the one or more encircling coils. In some embodiments, one or more controllers are adapted to control a subset of the shaping coils disposed on a surface of a removable field shaping unit. In some embodiments, one or more controllers may be adapted to control one or more of the optional control coils and/or the optional saddle coils. In some embodiments, the one or more controllers include one or more power supplies which may be configured to increase or decrease the electrical current flowing in a subset of the encircling coils and/or the shaping coils. In some embodiments, the one or more controllers include a switching system which may be configured to connect one or more power supplies to certain subsets of encircling coils and/or shaping coils.

Embodiments of the subject matter and the operations described in this disclosure may be implemented in digital electronic circuitry, or in computer software, firmware, or hardware, including the structures shown in this specification and their structural equivalents, or in combinations of one or more of them. Embodiments of the subject matter described in this disclosure may be implemented as one or more computer programs, i.e., one or more modules of computer program instructions, encoded on computer storage medium for execution by, or to control the operation of, data processing apparatus.

In some embodiments, the controller includes a processor and a non-transitory computer readable storage medium operably coupled to the processor. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this disclosure may be implemented as operations performed by a data processing apparatus on data stored on one or more computer-readable storage devices or received from other sources. In some embodiments, the non-transitory computer readable storage medium contains instructions that, when executed by the processor, cause the processor to adjust a strength of a field generated by one or more coils in order to contain plasma within the magnetic fields.

Additional Embodiments

In some embodiments, the encircling coils and field-shaping coil system are designed such that the following criterion is met to facilitate field shaping unit removal. Each pair of encircling coils define a volume formed by extending the mean plane of both encircling coils in the pair. This volume has a direction of maximal convergence of the bounding planes, such as toward the spine of an open book, and a direction of maximal divergence of the bounding planes, such as toward the outward edges of the pages of an open book. The allowed directions of translation for field shaping unit removal are toward the direction of maximal opening of the closest pair of encircling coils. In some embodiments, the encircling coil system is designed such that the radially outward direction is an allowed direction of translation. In some embodiments, the encircling coil system is designed such that the allowed directions of translation are not blocked by another structure or system, such as a central bucking structure.

A first additional embodiment of the present disclosure is stellarator comprising: (a) a field-shaping coil system comprising one or more toroidal sectors, wherein each of the one or more toroidal sectors include at least one removable field shaping unit which defines a void adapted to confine a plasma, wherein the at least one removable field shaping unit comprises: (i) one or more structural mounting elements; and (ii) one or more planar shaping coils disposed on a surface of the one or more structural mounting elements; and (b) a plurality of encircling coils which encircle the field-shaping coil system; wherein the at least one removable field shaping unit in each toroidal sector may be removed from the field-shaping coil system without removing or reconfiguring any encircling coils of the plurality of encircling coils which neighbor the at least one removable field shaping unit. In some embodiments, at least one of the plurality of encircling coils are planar. In some embodiments, each encircling coil of the plurality of encircling coils are planar.

In some embodiments, the one or more toroidal sectors each include one removable field shaping unit. In some embodiments, the one or more toroidal sectors each include two removable field shaping units. In some embodiments, the one or more toroidal sectors each include four removable field shaping units. In some embodiments, each of the four removable field shaping units approximate a poloidal sector. In some embodiments, the one or more toroidal sectors each include eight removable field shaping units.

In some embodiments, a number of toroidal sectors equals a number of encircling coils. In some embodiments, a number of field shaping units is 4 times greater than the number of encircling coils. In some embodiments, a number of toroidal sectors is greater than a number of encircling coils. In some embodiments, a number of toroidal sectors is 2 times greater than a number of encircling coils. In some embodiments, a number of field shaping units is at least 2 times greater than the number of encircling coils. In some embodiments, a number of field shaping units is at least 4 times greater than the number of encircling coils. In some embodiments, a number of toroidal sectors is 4 times greater than a number of encircling coils. In some embodiments, a number of field shaping units is at least 2 times greater than the number of encircling coils.

In some embodiments, the stellarator includes at least two removable field shaping units and wherein any two neighboring field shaping units include one or more edges which facilitate removably securing the two neighboring field shaping units to one another.

In some embodiments, the field-shaping coil system further includes a structural scaffolding, such as a scaffolding having a predetermined shape. In some embodiments, the scaffolding is adapted to support the at least one removable field shaping unit. In some embodiments, the scaffolding includes a set of poloidal ribs and a set of toroidal ribs. In some embodiments, the scaffolding includes one or more flanges which are complementary to one or more flanges of the at least one removable field shaping unit.

In some embodiments, the stellarator includes at least four encircling coils. In some embodiments, the plurality of encircling coils is included of one or more superconducting materials. In some embodiments, the plurality of encircling coils does not interlock with each other.

In some embodiments, the stellarator includes at least 4 field shaping units. In some embodiments, the surface of the one or more structural mounting elements faces the void. In some embodiments, each of the one or more field shaping units includes one structural mounting element. In some embodiments, each of the one or more field shaping units includes two or more structural mounting elements.

In some embodiments, the one or more planar shaping coils do not interlock with each other. In some embodiments, a shape of each planar shaping coil of the one or more planar shaping coils is substantially rectangular, substantially rectangular with rounded corners, or substantially circular. In some embodiments, each of the one or more field shaping units includes between about 5 and about 100 shaping coils. In some embodiments, each of the one or more field shaping units includes between about 5 and about 50 shaping coils. In some embodiments, the one or more shaping coils are included of a superconducting material.

In some embodiments, the stellarator further includes at least one fixed field shaping unit.

A second additional embodiment of the present disclosure is a stellarator comprising: (a) a field-shaping coil system including one or more removable field shaping units which define a void adapted to confine a plasma, wherein each removable field shaping unit comprises (i) one or more structural mounting elements; and (ii) one or more planar shaping coils disposed on a surface of the one or more structural mounting elements; and (b) a plurality of encircling coils which encircle the field-shaping coil system. In some embodiments, the one or more removable field shaping units may be removed without reconfiguring any nearby encircling coils. In some embodiments, the one or more removable field shaping units may be removed while maintaining any nearby encircling coils charged with cryogens. Since the field-shaping coil system defines a void which confines the plasma, and since the encircling coils encircle the field-shaping coil system, the encircling coils therefore encircle the plasma confined within the void. In some embodiments, the stellarator does not include any non-planar coils. In some embodiments, at least one planar shaping coil of the plurality of planar shaping coils is removable. In some embodiments, the one or more structural mounting elements are independently removable. In some embodiments, the stellarator further includes at least one fixed field shaping unit.

In some embodiments, the field-shaping coil system further includes a structural scaffolding, such as a structural scaffolding having a predetermined shape. In some embodiments, the scaffolding is adapted to support the at least one removable field shaping unit. In some embodiments, the scaffolding includes a set of poloidal ribs and a set of toroidal ribs. In some embodiments, the scaffolding includes one or more flanges which are complementary to one or more flanges of the at least one removable field shaping unit.

A third additional embodiment of the present disclosure is a stellarator comprising: (a) a field-shaping coil system including one or more removable field shaping units which define a void adapted to confine a plasma, wherein each removable field shaping unit comprises (i) one or more structural mounting elements; and (ii) one or more shaping coils disposed on a surface of the one or more structural mounting elements; and (b) a plurality of encircling coils which encircle the plasma and the field-shaping coil system, wherein the one or more shaping coils and the plurality of encircling coils are comprised of one or more superconducting materials, wherein the one or more removable field shaping units may be removed and/or replaced without removing or reconfiguring the plurality of encircling coils. In some embodiments, each of the one or more shaping coils disposed on the surface of the one or more structural mounting elements does not encircle the plasma. In some embodiments, the one or more shaping coils are planar. In some embodiments, each encircling coil of the plurality of encircling coils are planar. In some embodiments, the plurality of planar shaping coils is removable. In some embodiments, the one or more structural mounting elements are independently removable. In some embodiments, the stellarator further includes at least one fixed field shaping unit.

In some embodiments, the field-shaping coil system further includes a scaffolding, such as a scaffolding having a predetermined shape. In some embodiments, the scaffolding is adapted to support the at least one removable field shaping unit. In some embodiments, the scaffolding includes a set of poloidal ribs and a set of toroidal ribs. In some embodiments, the scaffolding includes one or more flanges which are complementary to one or more flanges of the at least one removable field shaping unit.

A fourth additional embodiment of the present disclosure is an assembly comprising a stellarator and a blanket, wherein the stellarator includes: (a) a field-shaping coil system comprising one or more toroidal sectors, wherein each of the one or more toroidal sectors include at least one removable field shaping unit which defines a void adapted to confine a plasma, wherein the at least one removable field shaping unit comprises: (i) one or more structural mounting elements; and (ii) one or more planar shaping coils disposed on a surface of the one or more structural mounting elements; and (b) a plurality of encircling coils which encircle the field-shaping coil system; wherein the at least one removable field shaping unit in each toroidal sector may be removed from the field-shaping coil system without removing or reconfiguring any encircling coils of the plurality of encircling coils which neighbor the at least one removable field shaping unit. In some embodiments, at least one of the plurality of encircling coils are planar. In some embodiments, each encircling coil of the plurality of encircling coils are planar. In some embodiments, the at least one field shaping unit is removed from the field-shaping coil system to expose at least a portion of the blanket. In some embodiments, the blanket is divided into a plurality of removable sections. In some embodiments, a first of the one or more toroidal sectors includes the at least one removable field shaping unit and a fixed field shaping unit.

In some embodiments, the one or more toroidal sectors each include one removable field shaping unit. In some embodiments, the one or more toroidal sectors each include two removable field shaping units. In some embodiments, the one or more toroidal sectors each include four removable field shaping units. In some embodiments, each of the four removable field shaping units define a poloidal sector. In some embodiments, the one or more toroidal sectors each include eight removable field shaping units.

In some embodiments, a number of toroidal sectors equals a number of encircling coils. In some embodiments, a number of field shaping units is 4 times greater than the number of encircling coils. In some embodiments, a number of toroidal sectors is greater than a number of encircling coils. In some embodiments, a number of toroidal sectors is 2 times greater than a number of encircling coils. In some embodiments, a number of field shaping units is at least 2 times greater than the number of encircling coils. In some embodiments, a number of field shaping units is at least 4 times greater than the number of encircling coils. In some embodiments, a number of toroidal sectors is 4 times greater than a number of encircling coils. In some embodiments, a number of field shaping units is at least 2 times greater than the number of encircling coils.

In some embodiments, the stellarator includes at least two removable field shaping units and wherein any two neighboring field shaping units include one or more edges which facilitate removably securing the two neighboring field shaping units to one another.

In some embodiments, the field-shaping coil system further includes a scaffolding, such as a scaffolding having a predetermined shape. In some embodiments, the scaffolding is adapted to support the at least one removable field shaping unit. In some embodiments, the scaffolding includes a set of poloidal ribs and a set of toroidal ribs. In some embodiments, the scaffolding includes one or more flanges which are complementary to one or more flanges of the at least one removable field shaping unit.

A fifth additional embodiment of the present disclosure is an assembly including a stellarator and a blanket, wherein the stellarator includes (a) a field-shaping coil system including one or more removable field shaping units which define a void adapted to confine a plasma, wherein each removable field shaping unit comprises (i) one or more structural mounting elements; and (ii) one or more planar shaping coils disposed on a surface of the one or more structural mounting elements; and (b) a plurality of encircling coils which encircle the field-shaping coil system. Since the field-shaping coil system defines a void which confines the plasma, and since the encircling coils encircle the field-shaping coil system, the encircling coils therefore encircle the plasma confined within the void. In some embodiments, at least one of the plurality of encircling coils are planar. In some embodiments, each encircling coil of the plurality of encircling coils are planar. In some embodiments, the stellarator does not include any non-planar coils. In some embodiments, at least one planar shaping coil of the plurality of planar shaping coils is removable. In some embodiments, the one or more structural mounting elements are independently removable. In some embodiments, the stellarator further includes at least one fixed field shaping unit. In some embodiments, the at least one field shaping unit is removed from the field-shaping coil system to expose at least a portion of the blanket. In some embodiments, the blanket is divided into a plurality of removable sections. In some embodiments, a first of the one or more toroidal sectors includes the at least one removable field shaping unit and a fixed field shaping unit.

In some embodiments, the field-shaping coil system further includes a scaffolding, such as a scaffolding having a predetermined shape. In some embodiments, the scaffolding is adapted to support the at least one removable field shaping unit. In some embodiments, the scaffolding includes a set of poloidal ribs and a set of toroidal ribs. In some embodiments, the scaffolding includes one or more flanges which are complementary to one or more flanges of the at least one removable field shaping unit.

A sixth additional embodiment of the present disclosure is a stellarator comprising: (a) a field-shaping coil system including at least two neighboring removable field shaping units which define a void adapted to confine a plasma, wherein each removable field shaping unit comprises (i) one or more structural mounting elements; (ii) one or more planar shaping coils disposed on a surface of the one or more structural mounting elements; and (iii) one or more fluid-carrying conduits; including at least one removable coupling; and (b) a plurality of encircling coils which encircle the field-shaping coil system; wherein the one or more fluid-carrying conduits of each removable field shaping unit span the at least two neighboring removable field shaping units. In some embodiments, at least one of the plurality of encircling coils are planar. In some embodiments, each encircling coil of the plurality of encircling coils are planar.

In some embodiments, the field-shaping coil system further includes a scaffolding, such as a scaffolding having a predetermined shape. In some embodiments, the scaffolding is adapted to support the at least one removable field shaping unit. In some embodiments, the scaffolding includes a set of poloidal ribs and a set of toroidal ribs. In some embodiments, the scaffolding includes one or more flanges which are complementary to one or more flanges of the at least one removable field shaping unit.

A seventh additional embodiment of the present disclosure is a stellarator comprising: (a) a field-shaping coil system including two or more removable field shaping units which define a void adapted to confine a plasma, wherein each removable field shaping unit comprises (i) one or more structural mounting elements; (ii) one or more planar shaping coils disposed on a surface of the one or more structural mounting elements; and (iii) a scaffolding; and (b) a plurality of encircling coils which encircle the field-shaping coil system. In some embodiments, each of the two or more removable field shaping units are removably coupled to the scaffolding. In some embodiments, each of the two or more removable field shaping units are removably coupled to the scaffolding; and wherein any neighboring removable field shaping units of the at least two removable field shaping units are further removably coupled to each other. In some embodiments, at least one of the plurality of encircling coils are planar. In some embodiments, each encircling coil of the plurality of encircling coils are planar.

An eighth additional aspect of the present disclosure is a stellarator comprising: (a) a field-shaping coil system including at least two removable field shaping units, the field-shaping coil system defining a void adapted to confine a plasma, wherein each of the at least two removable field shaping units comprise (i) one or more structural mounting elements; and (ii) one or more planar shaping coils disposed on a surface of the one or more structural mounting elements; and (b) a plurality of planar encircling coils which encircle the field-shaping coil system. In some embodiments, each of the at least two removable field shaping units are removable from the stellarator without having to reconfigure any one planar encircling coil of the plurality of planar encircling coils.

In some embodiments, a first of the at least two removable field shaping units is positioned at least partially behind a first planar encircling coil of the plurality of encircling coils. In some embodiments, the first planar encircling coil prevents the first removable field shaping unit from being translated outward away from the void. In some embodiments, a second of the at least two removable field shaping units is positioned beween the first planar encircling coil and a second planar encircling coil of the plurality of encircling coils. In some embodiments, the second of the at least two removable field shaping units may be translated outward away from the void without having to reconfigure either the first and second planar encircling coils.

In some embodiments, each of the at least two removable field shaping units are removable from the stellarator without having to reconfiguring any planar encircling coil which neighbors each of the at least two removable field shaping elements. In some embodiments, the planar encircling coils neighboring the first of the at least two removable field shaping units and the planar encircling coils neighboring the second of the at least two removable field shaping units are the same. In some embodiments, the planar encircling coils neighboring the first of the at least two removable field shaping units and the planar encircling coils neighboring the second of the at least two removable field shaping units are different.

In some embodiments, a first of the at least two removable field shaping units has a toroidal extent which is less than a toroidal extent between two planar encircling coils of the plurality of planar encircling coils which neighbor the first of the at least two removable field shaping units. In some embodiments, a first of the at least two removable field shaping units is positioned such that it may be removed from the field-shaping coil system by translating it outward away from the void. In some embodiments, a first of the at least two removable field shaping units is positioned such that it may be removed from the field-shaping coil system by translating it outward away from the void without any rotational movement. In some embodiments, one planar encircling coil of the plurality of planar encircling coils prevents the second of the at least two removable field shaping units from being translated outward away from the void.

All the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A stellarator comprising:
   (a) a structural scaffold comprising a set of poloidal ribs, a set of toroidal ribs, and one or more mounting members;
   (b) at least two field shaping units removably coupled to the one or more mounting members, wherein each of the at least two removable field shaping units comprise (i) one or more structural mounting elements; and (ii) one or more shaping coils disposed on a surface of the one or more structural mounting elements;
   (c) a plurality of encircling coils which encircle the field-shaping coil system, wherein a ratio of toroidal ribs to the plurality of encircling coils ranges from 1:1 to 5:1;
   wherein a first of the at least two removable field shaping units is at least partially surrounded by a first encircling coil of the plurality of encircling coils; and
   wherein a second of the at least two removable field shaping units is positioned entirely between the first encircling coil and a second encircling coil of the plurality of encircling coils;
   (d) a neutronic blanket comprising a plurality of blanket units.

2. The stellarator of claim 1, wherein a longitudinal distance between the first and second encircling coils is greater than a longitudinal dimension of the second removable field shaping unit.

3. The stellarator of claim 1, wherein the plurality of encircling coils is comprised of one or more superconducting materials.

4. The stellarator of claim 1, wherein the plurality of encircling coils does not interlock with each other.

5. The stellarator of claim 1, wherein the plurality of encircling coils interlocks the plasma.

6. The stellarator of claim 1, wherein the one or more shaping coils are removable.

7. The stellarator of claim 1, wherein the one or more structural mounting elements are removable.

8. The stellarator of claim 1, further comprising at least one of a neutron breeding blanket, a cryostat, and neutron shielding.

9. The stellarator of claim 1, wherein the stellarator comprises at least four encircling coils.

10. The stellarator of claim 1, wherein at least one of the encircling coils is planar.

11. The stellarator of claim 1, further comprising at least one fixed field shaping unit, wherein the at least one fixed field shaping unit comprise (i) one or more structural mounting elements; and (ii) one or more shaping coils disposed on a surface of the one or more structural mounting elements.

12. The stellarator of claim 1, wherein the one or more shaping coils are planar.

13. A stellarator adapted to confine a toroidal plasma comprising:
   (a) a structural scaffold comprising one or more curved plates and/or planar plates which conform to the boundary of the toroidal plasma;
   (b) at least two field shaping units removably coupled to the one or more curved plates and/or planar plates, wherein each of the at least two removable field shaping units comprise (i) one or more structural mounting elements; and (ii) one or more shaping coils disposed on a surface of the one or more structural mounting elements; and
   b) a plurality of encircling coils which encircle the field-shaping coil system;
   wherein a first of the at least two removable field shaping units is at least partially surrounded by a first encircling coil of the plurality of encircling coils; and
   wherein a second of the at least two removable field shaping units is positioned entirely between the first encircling coil and a second encircling coil of the plurality of encircling coils.

14. The stellarator of claim 13, wherein the one or more curved plates and/or planar plates have predetermined shapes.

15. A stellarator adapted to confine a toroidal plasma comprising:
   (a) a structural scaffold;
   (b) at least two field shaping units removably coupled to the structural scaffold, wherein each of the at least two removable field shaping units comprise (i) one or more structural mounting elements; and (ii) one or more shaping coils removably coupled to the one or more structural mounting elements, wherein each of the at least two field shaping units include one or more fluid-carrying carrying conduits and/or one or more electrical leads, wherein the one or more fluid conduits include one or more removable connections and wherein the one or more electrical leads include one or more disconnectable couplings; and b) a plurality of encircling coils which encircle the field-shaping coil system;

wherein a first of the at least two removable field shaping units is at least partially surrounded by a first encircling coil of the plurality of encircling coils; and wherein a second of the at least two removable field shaping units is positioned entirely between the first encircling coil and a second encircling coil of the plurality of encircling coils.

16. The stellarator of claim 15, wherein the at least two field shaping units each further comprise one or more vacuum line feedthroughs.

17. The stellarator of claim 13, wherein the structural scaffold comprises one or more curved plates.

18. The stellarator of claim 13, wherein the structural scaffold comprises one or more planar plates.

19. The stellarator of claim 13, wherein the structural scaffold comprises one or more curved plates and one or more planar plates.

20. The stellarator of claim 15, wherein the at least two field shaping units include one or more fluid-carrying conduits and one or more electrical leads.

* * * * *